(12) United States Patent
Dong

(10) Patent No.: US 12,273,539 B2
(45) Date of Patent: Apr. 8, 2025

(54) USER INTEREST BASED PACKETIZATION

(71) Applicant: Huawei Technologies Co., Ltd., Shenzhen (CN)

(72) Inventor: Lijun Dong, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 4 days.

(21) Appl. No.: 18/452,876

(22) Filed: Aug. 21, 2023

(65) Prior Publication Data

US 2024/0022733 A1    Jan. 18, 2024

Related U.S. Application Data

(63) Continuation of application No. PCT/US2021/019089, filed on Feb. 22, 2021.

(51) Int. Cl.
*H04N 7/12* (2006.01)
*H04N 19/127* (2014.01)
*H04N 19/167* (2014.01)
*H04N 19/169* (2014.01)
*H04N 19/176* (2014.01)
*H04N 19/37* (2014.01)

(52) U.S. Cl.
CPC .......... *H04N 19/167* (2014.11); *H04N 19/127* (2014.11); *H04N 19/176* (2014.11); *H04N 19/188* (2014.11); *H04N 19/37* (2014.11)

(58) Field of Classification Search
CPC ........................... H04N 19/127; H04N 19/188
See application file for complete search history.

(56) References Cited

U.S. PATENT DOCUMENTS 6,882,755 B2     4/2005   Selverstein et al.
2003/0202581 A1  10/2003  Kodama

*Primary Examiner* — Y Lee
(74) *Attorney, Agent, or Firm* — Conley Rose, P.C.

(57) ABSTRACT

An image coding mechanism is disclosed. The mechanism includes determining a region of interest in an image. The image is partitioned into a plurality of blocks. A transform is applied to the blocks to obtain a plurality of coefficients. The coefficients are assigned into quality layers of decreasing priority. Each subsequent layer includes data to incrementally increase quality of a reconstructed image. Region of interest coefficients are positioned in one or more image data packets by quality layer in order of decreasing priority. Remaining coefficients are positioned in the image data packets with a lower priority than the region of interest coefficients. The remaining coefficients are positioned by quality layer in order of decreasing priority. The image data packets are stored and transmitted over a network.

9 Claims, 15 Drawing Sheets

600

Remaining 649

Region of Interest 647

1400

```
┌─────────────────────────────────────────────────────┐
│ Receive one or more media data packets for an image │
│ containing a plurality of blocks, wherein the image │
│ includes a region of interest, wherein the blocks   │
│ are coded as quantization coefficients              │
│ corresponding to a transform, wherein the           │
│ quantization coefficients are positioned in the     │── 1401
│ media data packets in quality layers of decreasing  │
│ priority based on frequency, wherein each           │
│ subsequent quality layer includes data to           │
│ incrementally increase quality of a reconstructed   │
│ image, and wherein region of interest quantization  │
│ coefficients are positioned in the media data       │
│ packets with a higher priority than the remaining   │
│ quantization coefficients.                          │
└─────────────────────────────────────────────────────┘
                          │
                          ▼
┌─────────────────────────────────────────────────────┐
│ Position the region of interest quantization        │
│ coefficients in the image based on a location of    │── 1403
│ the region of interest quantization coefficients    │
│ contained in the media data packets.                │
└─────────────────────────────────────────────────────┘
                          │
                          ▼
┌─────────────────────────────────────────────────────┐
│ Iteratively decoding each block from the            │
│ quantization coefficients in order of most          │
│ significant quality layer to least significant      │── 1405
│ quality layer via an inverse transform. Decoding    │
│ may occur when the number of remaining layers       │
│ in/outside the region of interest exceeds the loss  │
│ tolerance in/outside the region of interest.        │
└─────────────────────────────────────────────────────┘
                          │
                          ▼
┌─────────────────────────────────────────────────────┐
│                                                     │── 1407
│ Combine the blocks to reconstruct the image.        │
└─────────────────────────────────────────────────────┘
```

FIG. 14

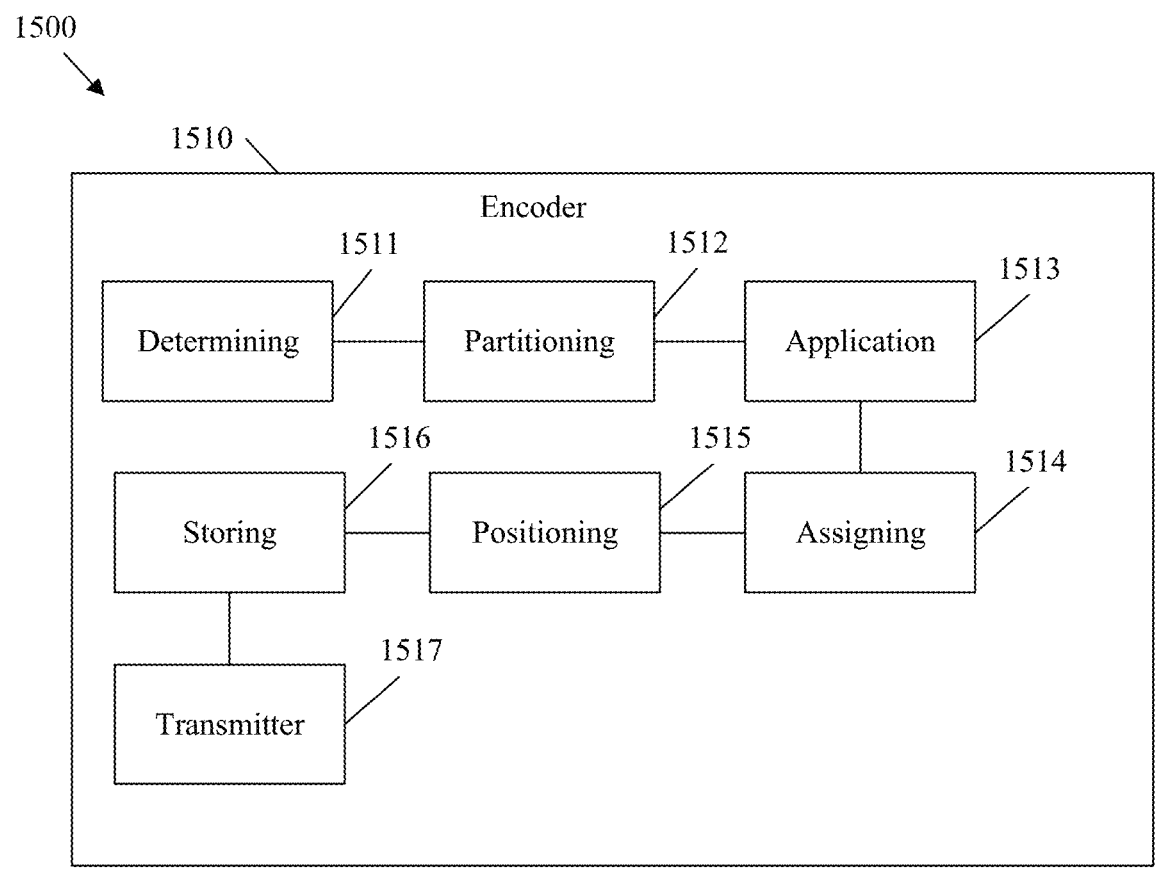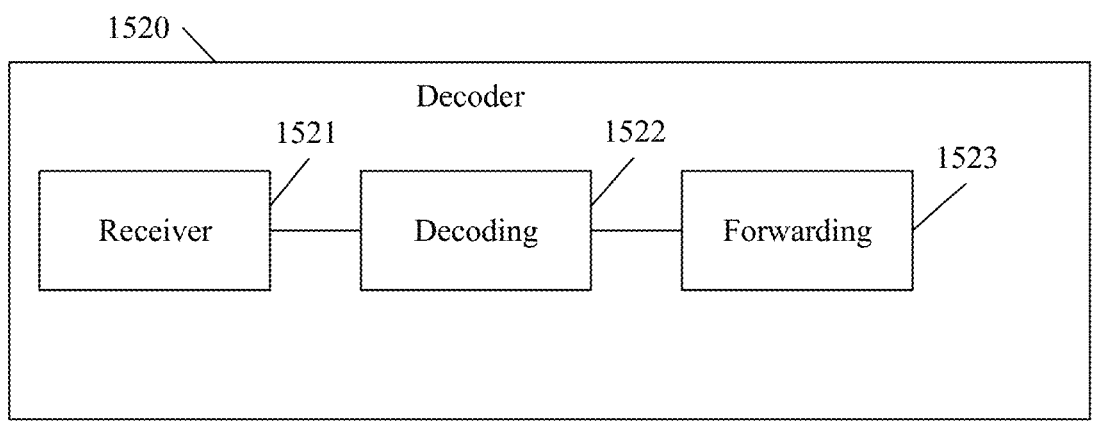
FIG. 15

USER INTEREST BASED PACKETIZATION

CROSS-REFERENCE TO RELATED APPLICATIONS

This application is a continuation of International Patent Application No. PCT/US2021/019089, filed Feb. 22, 2021, entitled "USER INTEREST BASED PACKETIZATION," which is hereby incorporated by reference in its entirety.

TECHNICAL FIELD

The present disclosure is generally related to media data coding, and is specifically related to mechanisms for coding image data to allow a transmission network to dynamically reduce quality of the image data based on image data content in order to support transmission in the presence of network congestion.

BACKGROUND

Joint Photographic Experts Group (JPEG) is a name for a file format and common mechanism for compressing an image. JPEG employs a lossy compression, which means that the image is compressed in a manner that allows the image to be decompressed with a predetermined amount of data loss. The degree of compression can be adjusted at the time of encoding to allow for a selectable tradeoff between the data size of the image and image quality. However, once the encoding is complete, the data size of the image is fixed. The JPEG can be sent to a user. However, networks are often highly dynamic and variable environments. Further, image transfers are often low priority communications. As such, data packets containing JPEGs may be dropped in transit when sudden congestion occurs in the network. This allows higher priority traffic to be managed. The static size of JPEGs after encoding may not support actions that are responsive to changes in network status. As such, a dropped packet containing a JPEG may only be remedied in most systems by requesting that the packet be resent.

SUMMARY

In an embodiment, the disclosure includes a method implemented by a network device, the method comprising: determining, by one or more processors of the encoder, a region of interest in an image; partitioning, by the processors, the image into a plurality of blocks; applying, by the processors, a transform to the blocks to obtain a plurality of coefficients; assigning, by the processors, the coefficients into quality layers of decreasing priority, wherein each subsequent layer includes data to incrementally increase quality of a reconstructed image; positioning, by the processors, region of interest coefficients in one or more image data packets by quality layer in order of decreasing priority; positioning, by the processors, remaining coefficients in the image data packets with a lower priority than the region of interest coefficients, the remaining coefficients positioned by quality layer in order of decreasing priority; storing, by a memory of the encoder, the image data packets; and transmitting, by a transmitter, the image data packets over a network.

Network qualitative communication is a network paradigm configured to mitigate data loss in a network due to network congestion. In a network configured for network qualitative communication, network nodes are configured to perform a packet wash operation. A packet wash is performed when a packet would otherwise be dropped due to network congestion. Instead of dropping the entire packet, the packet wash removes portions of the packet called chunks. This has the effect of reducing the size of the packet until that packet is small enough to be handled by the network in spite of the congestion. The chunks of the packets can be arranged in order of priority so that the most important information is preserved while the least important information is discarded during the packet wash operation. As a result, the most important information in a packet may still be successfully transmitted through the network instead of being dropped. Such a packet wash operation is not designed to operate on compressed images. An image may be compressed to a predetermined size at the time of encoding. For example, the encoding mechanism may arrange the compressed image data based on correlations between the data and not based on a priority. As an example, a JPEG can be partitioned into blocks and compressed by applying a transform to each of the blocks. However, the resulting data is arranged by block and not by priority. Accordingly, a packet wash operation may not be directly applied to an image data packet as the packet wash may be unable to determine which data can be discarded and which data should be maintained. Further, in some cases users may consider loss of quality in certain areas of an image to be more acceptable than in other areas of the image. Such targeted loss of quality may not be supported by example networks.

The present aspect includes a mechanism for applying a packet wash to an image data packet so that the image data packet can be reduced in size/quality as desired to avoid a complete packet drop. Further, the disclosed mechanism may accept a region of interest as in input. The image data packet can be arranged so that the packet wash reduces the size of the image data packet by dropping data relating to areas outside the region of interest. In this way, the image displayed to the user prioritizes quality in the region of interest over quality outside the region of interest. For example, an image data packet may include any type of image compressed by a transform. As a particular example, an image data packet may contain a JPEG compressed by employing a discrete cosine transform (DCT). In order to accomplish this mechanism, the compressed data in an image data packet is rearranged in order of priority. The image data is partitioned into blocks. A transform is applied to each block to transform each block of the image data as a series of quantization coefficients. The quantization coefficients are included in quality layers based on the effect such quantization coefficients have on the reconstructed image. Once the quantization coefficients are included in quality layers, the quantization coefficients can be included in an image data packet in order of a priority. A network node can then perform a packet wash by removing chunks and/or quality layers from the end of the packet. The most important quantization coefficients, as defined by the priority, are thereby preserved. For example, the priority may position quantization coefficients associated with blocks in a region of interest in front of blocks that are outside of the region of interest. Further, the priority may order the quantization coefficients based on quality layer. Accordingly, the image data packet is arranged by a desired priority to allow for dynamic reduction in quality of the image data as part of a packet wash operation. This allows a requestor to receive a requested image at a lower quality in case of network congestion instead of receiving nothing due to a complete packet drop. This mechanism may provide a better user experience. Further, this mechanism may allow the user to re-request that only dropped information be resent rather than resending the entire image, which would otherwise create additional network congestion. As such, the present mechanism creates additional functionality and reduces processor, memory, and/or network resource usage by an encoder, a content server, a decoder, and/or an intermediate network node in a communication network.

Optionally, in any of the preceding aspects, another implementation of the aspect provides, wherein the region of interest coefficients comprise coefficients in a most significant quality layer of a region of interest and coefficients in a less significant quality layer of the region of interest, wherein the remaining coefficients comprise coefficients in a most significant quality layer of a remaining region and coefficients in a less significant quality layer of the remaining region, wherein the coefficients in the most significant quality layer of the region of interest are positioned in the image data packets with a higher priority than the coefficients in the most significant quality layer of the remaining region, wherein the coefficients in the most significant quality layer of the remaining region are positioned in the image data packets with a higher priority than the coefficients in the less significant quality layer of the region of interest, and wherein the coefficients in the less significant quality layer of the region of interest are positioned in the image data packets with a higher priority than the coefficients in the less significant quality layer of the remaining region.

Optionally, in any of the preceding aspects, another implementation of the aspect provides, wherein all of the region of interest coefficients are positioned in the image data packets with a higher priority than the remaining coefficients.

Optionally, in any of the preceding aspects, another implementation of the aspect provides, further comprising encoding in a header of the image data packets, by the processors, a location of the region of interest coefficients in the reconstructed image.

Optionally, in any of the preceding aspects, another implementation of the aspect provides, further comprising encoding in a header of the image data packets, by the processors, an indication of a number of blocks in the region of interest.

Optionally, in any of the preceding aspects, another implementation of the aspect provides, further comprising encoding in a header of the image data packets, by the processors, an indication of a number of blocks outside the region of interest.

Optionally, in any of the preceding aspects, another implementation of the aspect provides, further comprising encoding in a header of the image data packets, by the processors, an indication of a loss tolerance for the region of interest.

Optionally, in any of the preceding aspects, another implementation of the aspect provides, further comprising receiving, by a receiver, the loss tolerance for the region of interest from the decoder, wherein the region of interest coefficients are assigned into quality layers and positioned in the image data packets based on the loss tolerance for the region of interest.

Optionally, in any of the preceding aspects, another implementation of the aspect provides, further comprising encoding in a header of the image data packets, by the processors, a loss tolerance outside the region of interest.

Optionally, in any of the preceding aspects, another implementation of the aspect provides, further comprising receiving, by the receiver, the loss tolerance outside the region of interest from the decoder, wherein the remaining coefficients are organized into quality layers and positioned in the image data packets based on the loss tolerance outside the region of interest.

Optionally, in any of the preceding aspects, another implementation of the aspect provides, further comprising encoding in a header of the image data packets, by the processors, an indication of a number of remaining layers for the region of interest and a number of remaining layers outside the region of interest.

Optionally, in any of the preceding aspects, another implementation of the aspect provides, further comprising receiving, by the receiver of the encoder, an indication of an interested object from a decoder, wherein the region of interest is determined based on the indication of interested object.

Optionally, in any of the preceding aspects, another implementation of the aspect provides, wherein lower priority indicates a relative importance between regions, and wherein decreasing priority indicates a relative importance between quality layers.

In an embodiment, the disclosure includes a method implemented by a decoder, the method comprising: receiving, by a receiver of the decoder, one or more image data packets for an image containing a plurality of blocks, wherein the image includes a region of interest, wherein the blocks are coded as coefficients corresponding to a transform, wherein the coefficients are positioned in the image data packets in quality layers of decreasing priority, wherein each subsequent quality layer includes data to incrementally increase quality of a reconstructed image, and wherein region of interest coefficients are positioned in the image data packets with a higher priority than the remaining coefficients; decoding, by one or more processors of the decoder, each block from the coefficients in order of most significant quality layer to least significant quality layer via an inverse transform; and combining, by the processors, the blocks to reconstruct the image.

Network qualitative communication is a network paradigm configured to mitigate data loss in a network due to network congestion. In a network configured for network qualitative communication, network nodes are configured to perform a packet wash operation. A packet wash is performed when a packet would otherwise be dropped due to network congestion. Instead of dropping the entire packet, the packet wash removes portions of the packet called chunks. This has the effect of reducing the size of the packet until that packet is small enough to be handled by the network in spite of the congestion. The chunks of the packets can be arranged in order of priority so that the most important information is preserved while the least important information is discarded during the packet wash operation. As a result, the most important information in a packet may still be successfully transmitted through the network instead of being dropped. Such a packet wash operation is not designed to operate on compressed images. An image may be compressed to a predetermined size at the time of encoding. For example, the encoding mechanism may arrange the compressed image data based on correlations between the data and not based on a priority. As an example, a JPEG can be partitioned into blocks and compressed by applying a transform to each of the blocks. However, the resulting data is arranged by block and not by priority. Accordingly, a packet wash operation may not be directly applied to an image data packet as the packet wash may be unable to determine which data can be discarded and which data should be maintained. Further, in some cases users may consider loss of quality in certain areas of an image to be more acceptable than in other areas of the image. Such targeted loss of quality may not be supported by example networks.

The present aspect includes a mechanism for applying a packet wash to an image data packet so that the image data packet can be reduced in size/quality as desired to avoid a complete packet drop. Further, the disclosed mechanism may accept a region of interest as in input. The image data packet can be arranged so that the packet wash reduces the size of the image data packet by dropping data relating to areas outside the region of interest. In this way, the image displayed to the user prioritizes quality in the region of interest over quality outside the region of interest. For example, an image data packet may include any type of image compressed by a transform. As a particular example, an image data packet may contain a JPEG compressed by employing a discrete cosine transform (DCT). In order to accomplish this mechanism, the compressed data in an image data packet is rearranged in order of priority. The image data is partitioned into blocks. A transform is applied to each block to transform each block of the image data as a series of quantization coefficients. The quantization coefficients are included in quality layers based on the effect such quantization coefficients have on the reconstructed image. Once the quantization coefficients are included in quality layers, the quantization coefficients can be included in an image data packet in order of a priority. A network node can then perform a packet wash by removing chunks and/or quality layers from the end of the packet. The most important quantization coefficients, as defined by the priority, are thereby preserved. For example, the priority may position quantization coefficients associated with blocks in a region of interest in front of blocks that are outside of the region of interest. Further, the priority may order the quantization coefficients based on quality layer. Accordingly, the image data packet is arranged by a desired priority to allow for dynamic reduction in quality of the image data as part of a packet wash operation. This allows a requestor to receive a requested image at a lower quality in case of network congestion instead of receiving nothing due to a complete packet drop. This mechanism may provide a better user experience. Further, this mechanism may allow the user to re-request that only dropped information be resent rather than resending the entire image, which would otherwise create additional network congestion. As such, the present mechanism creates additional functionality and reduces processor, memory, and/or network resource usage by an encoder, a content server, a decoder, and/or an intermediate network node in a communication network.

Optionally, in any of the preceding aspects, another implementation of the aspect provides, further comprising positioning, by the processors, the region of interest coefficients in the image based on a location of the region of interest coefficients contained in the image data packets.

Optionally, in any of the preceding aspects, another implementation of the aspect provides, wherein the region of interest coefficients comprise coefficients in a most significant quality layer of a region of interest and coefficients in a less significant quality layer of the region of interest, wherein the remaining coefficients comprise coefficients in a most significant quality layer of a remaining region and coefficients in a less significant quality layer of the remaining region, wherein the coefficients in the most significant quality layer of the region of interest are positioned in the image data packets with a higher priority than the coefficients in the most significant quality layer of the remaining region, wherein the coefficients in the most significant quality layer of the remaining region are positioned in the image data packets with a higher priority than the coefficients in the less significant quality layer of the region of interest, and wherein the coefficients in the less significant quality layer of the region of interest are positioned in the image data packets with a higher priority than the coefficients in the less significant quality layer of the remaining region.

Optionally, in any of the preceding aspects, another implementation of the aspect provides, wherein all of the region of interest coefficients are positioned in the image data packets with a higher priority than the remaining coefficients.

Optionally, in any of the preceding aspects, another implementation of the aspect provides, wherein the image data packets contain an indication of a number of blocks in the region of interest, and wherein the region of interest coefficients are positioned in the image based on the number of blocks in the region of interest.

Optionally, in any of the preceding aspects, another implementation of the aspect provides, wherein the image data packets contain an indication of a number of blocks outside the region of interest, and wherein the region of interest coefficients are positioned in the image based on the number of blocks outside the region of interest.

Optionally, in any of the preceding aspects, another implementation of the aspect provides, wherein the image data packets contain an indication of a number of remaining layers for the region of interest, wherein the image data packets contain an indication of a loss tolerance for the region of interest, and wherein the blocks are decoded when the number of remaining layers for the region of interest meets or exceeds the loss tolerance for the region of interest.

Optionally, in any of the preceding aspects, another implementation of the aspect provides, wherein the image data packets contain an indication of a number of remaining layers outside the region of interest, wherein the image data packets contain an indication of a loss tolerance outside the region of interest, and wherein the blocks are decoded when the number of remaining layers outside the region of interest meets or exceeds the loss tolerance outside the region of interest.

Optionally, in any of the preceding aspects, another implementation of the aspect provides, further comprising transmitting, by a transmitter of the decoder, a request for the image, wherein the request for the image contains an indication of an interested object represented by the region of interest, a loss tolerance for the region of interest, a loss tolerance outside the region of interest, or combinations thereof.

Optionally, in any of the preceding aspects, another implementation of the aspect provides, wherein the image data packets contain a number of layers, and wherein blocks of the image for the region of interest are reconstructed at a quality that is less than a quality of an encoded version of the image when the number of remaining layers for the region of interest is less than the number of layers.

Optionally, in any of the preceding aspects, another implementation of the aspect provides, wherein blocks of the image outside the region of interest are reconstructed at a quality that is less than a quality of an encoded version of the image when the number of remaining layers outside the region of interest is less than the number of layers.

Optionally, in any of the preceding aspects, another implementation of the aspect provides, wherein the quality for blocks of the image for the region of interest is greater than the quality for blocks of the image outside the region of interest.

Optionally, in any of the preceding aspects, another implementation of the aspect provides, further comprising: determining, by the processors, missing layers for the region of interest by comparing the number of remaining layers for the region of interest to the number of layers; and transmitting, by a transmitter of the decoder, a request to resend the missing layers for the region of interest.

Optionally, in any of the preceding aspects, another implementation of the aspect provides, further comprising: determining, by the processors, missing layers outside the region of interest by comparing the number of remaining layers outside the region of interest to the number of layers; and transmitting, by a transmitter of the decoder, a request to resend the missing layers outside the region of interest.

In an embodiment, the disclosure includes a network device comprising: a memory storing one or more image data packets for an image containing a plurality of blocks, wherein the image includes a region of interest, wherein the blocks are coded as coefficients corresponding to a transform, wherein the coefficients are positioned in the image data packets in quality layers of decreasing priority, wherein each subsequent quality layer includes data to incrementally increase quality of a reconstructed image, and wherein region of interest coefficients are positioned in the image data packets with a higher priority than the remaining coefficients; and a transmitter coupled to the memory and configured to transmit the one or more image data packets.

Network qualitative communication is a network paradigm configured to mitigate data loss in a network due to network congestion. In a network configured for network qualitative communication, network nodes are configured to perform a packet wash operation. A packet wash is performed when a packet would otherwise be dropped due to network congestion. Instead of dropping the entire packet, the packet wash removes portions of the packet called chunks. This has the effect of reducing the size of the packet until that packet is small enough to be handled by the network in spite of the congestion. The chunks of the packets can be arranged in order of priority so that the most important information is preserved while the least important information is discarded during the packet wash operation. As a result, the most important information in a packet may still be successfully transmitted through the network instead of being dropped. Such a packet wash operation is not designed to operate on compressed images. An image may be compressed to a predetermined size at the time of encoding. For example, the encoding mechanism may arrange the compressed image data based on correlations between the data and not based on a priority. As an example, a JPEG can be partitioned into blocks and compressed by applying a transform to each of the blocks. However, the resulting data is arranged by block and not by priority. Accordingly, a packet wash operation may not be directly applied to an image data packet as the packet wash may be unable to determine which data can be discarded and which data should be maintained. Further, in some cases users may consider loss of quality in certain areas of an image to be more acceptable than in other areas of the image. Such targeted loss of quality may not be supported by example networks.

The present aspect includes a mechanism for applying a packet wash to an image data packet so that the image data packet can be reduced in size/quality as desired to avoid a complete packet drop. Further, the disclosed mechanism may accept a region of interest as in input. The image data packet can be arranged so that the packet wash reduces the size of the image data packet by dropping data relating to areas outside the region of interest. In this way, the image displayed to the user prioritizes quality in the region of interest over quality outside the region of interest. For example, an image data packet may include any type of image compressed by a transform. As a particular example, an image data packet may contain a JPEG compressed by employing a discrete cosine transform (DCT). In order to accomplish this mechanism, the compressed data in an image data packet is rearranged in order of priority. The image data is partitioned into blocks. A transform is applied to each block to transform each block of the image data as a series of quantization coefficients. The quantization coefficients are included in quality layers based on the effect such quantization coefficients have on the reconstructed image. Once the quantization coefficients are included in quality layers, the quantization coefficients can be included in an image data packet in order of a priority. A network node can then perform a packet wash by removing chunks and/or quality layers from the end of the packet. The most important quantization coefficients, as defined by the priority, are thereby preserved. For example, the priority may position quantization coefficients associated with blocks in a region of interest in front of blocks that are outside of the region of interest. Further, the priority may order the quantization coefficients based on quality layer. Accordingly, the image data packet is arranged by a desired priority to allow for dynamic reduction in quality of the image data as part of a packet wash operation. This allows a requestor to receive a requested image at a lower quality in case of network congestion instead of receiving nothing due to a complete packet drop. This mechanism may provide a better user experience. Further, this mechanism may allow the user to re-request that only dropped information be resent rather than resending the entire image, which would otherwise create additional network congestion. As such, the present mechanism creates additional functionality and reduces processor, memory, and/or network resource usage by an encoder, a content server, a decoder, and/or an intermediate network node in a communication network.

Optionally, in any of the preceding aspects, another implementation of the aspect provides, further comprising a receiver configured to receive the one or more image data packets prior to transmission of the one or more image data packets at the transmitter.

Optionally, in any of the preceding aspects, another implementation of the aspect provides, wherein the region of interest coefficients comprise coefficients in a most significant quality layer of a region of interest and coefficients in a less significant quality layer of the region of interest, wherein the remaining coefficients comprise coefficients in a most significant quality layer of a remaining region and coefficients in a less significant quality layer of the remaining region, wherein the coefficients in the most significant quality layer of the region of interest are positioned in the image data packets with a higher priority than the coefficients in the most significant quality layer of the remaining region, wherein the coefficients in the most significant quality layer of the remaining region are positioned in the image data packets with a higher priority than the coefficients in the less significant quality layer of the region of interest, and wherein the coefficients in the less significant quality layer of the region of interest are positioned in the image data packets with a higher priority than the coefficients in the less significant quality layer of the remaining region.

Optionally, in any of the preceding aspects, another implementation of the aspect provides, wherein all of the region of interest coefficients are positioned in the image data packets with a higher priority than the remaining coefficients.

Optionally, in any of the preceding aspects, another implementation of the aspect provides, further comprising dropping data from the remaining coefficients prior to dropping data from the region of interest coefficients in response to detected congestion in a qualitative communication network.

Optionally, in any of the preceding aspects, another implementation of the aspect provides, wherein the image data packets contain an indication of a number of remaining layers for the region of interest, and wherein the network device comprises one or more processors configured to update the number of remaining layers for the region of interest when data is dropped from the region of interest coefficients.

Optionally, in any of the preceding aspects, another implementation of the aspect provides, wherein the image data packets contain an indication of a number of remaining layers outside the region of interest, and wherein the processors are further configured to update the number of remaining layers outside the region of interest when data is dropped from the remaining coefficients.

Optionally, in any of the preceding aspects, another implementation of the aspect provides, wherein the image data packets contain an indication of a loss tolerance for the region of interest, and wherein the network device comprises one or more processors configured to drop the image data packets when dropping data from the region of interest coefficients would exceed the loss tolerance for the region of interest.

Optionally, in any of the preceding aspects, another implementation of the aspect provides, wherein the image data packets contain an indication of a loss tolerance outside the region of interest, and wherein the processors are further configured to drop the image data packets when dropping data from the remaining coefficients would exceed the loss tolerance outside the region of interest.

In an embodiment, the disclosure includes a method implemented by a network device, the method comprising: assigning, by the processors, a plurality of coefficients associated with blocks in an image into quality layers of decreasing priority, wherein each subsequent layer includes data to incrementally increase quality of a reconstructed image; positioning, by the processors, region of interest coefficients in one or more image data packets by quality layer in order of decreasing priority; positioning, by the processors, remaining coefficients in the image data packets with a lower priority than the region of interest coefficients, the remaining coefficients positioned by quality layer in order of decreasing priority; storing, by a memory of the encoder, the image data packets; and transmitting, by a transmitter, the image data packets over a network.

Network qualitative communication is a network paradigm configured to mitigate data loss in a network due to network congestion. In a network configured for network qualitative communication, network nodes are configured to perform a packet wash operation. A packet wash is performed when a packet would otherwise be dropped due to network congestion. Instead of dropping the entire packet, the packet wash removes portions of the packet called chunks. This has the effect of reducing the size of the packet until that packet is small enough to be handled by the network in spite of the congestion. The chunks of the packets can be arranged in order of priority so that the most important information is preserved while the least important information is discarded during the packet wash operation. As a result, the most important information in a packet may still be successfully transmitted through the network instead of being dropped. Such a packet wash operation is not designed to operate on compressed images. An image may be compressed to a predetermined size at the time of encoding. For example, the encoding mechanism may arrange the compressed image data based on correlations between the data and not based on a priority. As an example, a JPEG can be partitioned into blocks and compressed by applying a transform to each of the blocks. However, the resulting data is arranged by block and not by priority. Accordingly, a packet wash operation may not be directly applied to an image data packet as the packet wash may be unable to determine which data can be discarded and which data should be maintained. Further, in some cases users may consider loss of quality in certain areas of an image to be more acceptable than in other areas of the image. Such targeted loss of quality may not be supported by example networks.

The present aspect includes a mechanism for applying a packet wash to an image data packet so that the image data packet can be reduced in size/quality as desired to avoid a complete packet drop. Further, the disclosed mechanism may accept a region of interest as in input. The image data packet can be arranged so that the packet wash reduces the size of the image data packet by dropping data relating to areas outside the region of interest. In this way, the image displayed to the user prioritizes quality in the region of interest over quality outside the region of interest. For example, an image data packet may include any type of image compressed by a transform. As a particular example, an image data packet may contain a JPEG compressed by employing a discrete cosine transform (DCT). In order to accomplish this mechanism, the compressed data in an image data packet is rearranged in order of priority. The image data is partitioned into blocks. A transform is applied to each block to transform each block of the image data as a series of quantization coefficients. The quantization coefficients are included in quality layers based on the effect such quantization coefficients have on the reconstructed image. Once the quantization coefficients are included in quality layers, the quantization coefficients can be included in an image data packet in order of a priority. A network node can then perform a packet wash by removing chunks and/or quality layers from the end of the packet. The most important quantization coefficients, as defined by the priority, are thereby preserved. For example, the priority may position quantization coefficients associated with blocks in a region of interest in front of blocks that are outside of the region of interest. Further, the priority may order the quantization coefficients based on quality layer. Accordingly, the image data packet is arranged by a desired priority to allow for dynamic reduction in quality of the image data as part of a packet wash operation. This allows a requestor to receive a requested image at a lower quality in case of network congestion instead of receiving nothing due to a complete packet drop. This mechanism may provide a better user experience. Further, this mechanism may allow the user to re-request that only dropped information be resent rather than resending the entire image, which would otherwise create additional network congestion. As such, the present mechanism creates additional functionality and reduces processor, memory, and/or network resource usage by an encoder, a content server, a decoder, and/or an intermediate network node in a communication network.

Optionally, in any of the preceding aspects, another implementation of the aspect provides, wherein the region of interest coefficients comprise coefficients in a most significant quality layer of a region of interest and coefficients in a less significant quality layer of the region of interest, wherein the remaining coefficients comprise coefficients in a most significant quality layer of a remaining region and coefficients in a less significant quality layer of the remaining region, wherein the coefficients in the most significant quality layer of the region of interest are positioned in the image data packets with a higher priority than the coefficients in the most significant quality layer of the remaining region, wherein the coefficients in the most significant quality layer of the remaining region are positioned in the image data packets with a higher priority than the coefficients in the less significant quality layer of the region of interest, and wherein the coefficients in the less significant quality layer of the region of interest are positioned in the image data packets with a higher priority than the coefficients in the less significant quality layer of the remaining region.

Optionally, in any of the preceding aspects, another implementation of the aspect provides, wherein all of the region of interest coefficients are positioned in the image data packets with a higher priority than the remaining coefficients.

Optionally, in any of the preceding aspects, another implementation of the aspect provides, further comprising encoding in the image data packets, by the processors, a location of the region of interest coefficients in the reconstructed image.

Optionally, in any of the preceding aspects, another implementation of the aspect provides, further comprising encoding in the image data packets, by the processors, an indication of a number of blocks in the region of interest.

Optionally, in any of the preceding aspects, another implementation of the aspect provides, further comprising encoding in the image data packets, by the processors, an indication of a number of blocks outside the region of interest.

Optionally, in any of the preceding aspects, another implementation of the aspect provides, further comprising encoding in the image data packets, by the processors, an indication of a loss tolerance for the region of interest.

In an embodiment, the disclosure includes a coding device comprising: a processor, a receiver coupled to the processor, a memory coupled to the processor, and a transmitter coupled to the processor, wherein the processor, receiver, memory, and transmitter are configured to perform the method of any of the preceding aspects.

In an embodiment, the disclosure includes a non-transitory computer readable medium comprising a computer program product for use by a coding device, the computer program product comprising computer executable instructions stored on the non-transitory computer readable medium such that when executed by a processor cause the coding device to perform the method of any of the preceding aspects.

In an embodiment, the disclosure includes a network device comprising: a determining means for determining a region of interest in an image; a partitioning means for partitioning the image into a plurality of blocks; an application means for applying a transform to the blocks to obtain a plurality coefficients; an assigning means for assigning the coefficients into quality layers of decreasing priority, wherein each subsequent layer includes data to incrementally increase quality of a reconstructed image; a positioning means for: positioning region of interest coefficients in one or more image data packets by quality layer in order of decreasing priority; and positioning remaining coefficients in the image data packets with a lower priority than the region of interest coefficients, the remaining coefficients positioned by quality layer in order of decreasing priority; and a storing means for storing the image data packets.

Network qualitative communication is a network paradigm configured to mitigate data loss in a network due to network congestion. In a network configured for network qualitative communication, network nodes are configured to perform a packet wash operation. A packet wash is performed when a packet would otherwise be dropped due to network congestion. Instead of dropping the entire packet, the packet wash removes portions of the packet called chunks. This has the effect of reducing the size of the packet until that packet is small enough to be handled by the network in spite of the congestion. The chunks of the packets can be arranged in order of priority so that the most important information is preserved while the least important information is discarded during the packet wash operation. As a result, the most important information in a packet may still be successfully transmitted through the network instead of being dropped. Such a packet wash operation is not designed to operate on compressed images. An image may be compressed to a predetermined size at the time of encoding. For example, the encoding mechanism may arrange the compressed image data based on correlations between the data and not based on a priority. As an example, a JPEG can be partitioned into blocks and compressed by applying a transform to each of the blocks. However, the resulting data is arranged by block and not by priority. Accordingly, a packet wash operation may not be directly applied to an image data packet as the packet wash may be unable to determine which data can be discarded and which data should be maintained. Further, in some cases users may consider loss of quality in certain areas of an image to be more acceptable than in other areas of the image. Such targeted loss of quality may not be supported by example networks.

The present aspect includes a mechanism for applying a packet wash to an image data packet so that the image data packet can be reduced in size/quality as desired to avoid a complete packet drop. Further, the disclosed mechanism may accept a region of interest as in input. The image data packet can be arranged so that the packet wash reduces the size of the image data packet by dropping data relating to areas outside the region of interest. In this way, the image displayed to the user prioritizes quality in the region of interest over quality outside the region of interest. For example, an image data packet may include any type of image compressed by a transform. As a particular example, an image data packet may contain a JPEG compressed by employing a discrete cosine transform (DCT). In order to accomplish this mechanism, the compressed data in an image data packet is rearranged in order of priority. The image data is partitioned into blocks. A transform is applied to each block to transform each block of the image data as a series of quantization coefficients. The quantization coefficients are included in quality layers based on the effect such quantization coefficients have on the reconstructed image. Once the quantization coefficients are included in quality layers, the quantization coefficients can be included in an image data packet in order of a priority. A network node can then perform a packet wash by removing chunks and/or quality layers from the end of the packet. The most important quantization coefficients, as defined by the priority, are thereby preserved. For example, the priority may position quantization coefficients associated with blocks in a region of interest in front of blocks that are outside of the region of interest. Further, the priority may order the quantization coefficients based on quality layer. Accordingly, the image data packet is arranged by a desired priority to allow for dynamic reduction in quality of the image data as part of a packet wash operation. This allows a requestor to receive a requested image at a lower quality in case of network congestion instead of receiving nothing due to a complete packet drop. This mechanism may provide a better user experience. Further, this mechanism may allow the user to re-request that only dropped information be resent rather than resending the entire image, which would otherwise create additional network congestion. As such, the present mechanism creates additional functionality and reduces processor, memory, and/or network resource usage by an encoder, a content server, a decoder, and/or an intermediate network node in a communication network.

Optionally, in any of the preceding aspects, another implementation of the aspect provides, wherein the network device is further configured to perform the method of any of the preceding aspects.

In an embodiment, the disclosure includes a decoder comprising: a receiving means for receiving one or more image data packets for an image containing a plurality of blocks, wherein the image includes a region of interest, wherein the blocks are coded as coefficients corresponding to a transform, wherein the coefficients are positioned in the image data packets in quality layers of decreasing priority, wherein each subsequent quality layer includes data to incrementally increase quality of a reconstructed image, and wherein region of interest coefficients are positioned in the image data packets with a higher priority than the remaining coefficients; and a decoding means for: decoding each block from the coefficients in order of most significant quality layer to least significant quality layer via an inverse transform; and combining the blocks to reconstruct an image.

Network qualitative communication is a network paradigm configured to mitigate data loss in a network due to network congestion. In a network configured for network qualitative communication, network nodes are configured to perform a packet wash operation. A packet wash is performed when a packet would otherwise be dropped due to network congestion. Instead of dropping the entire packet, the packet wash removes portions of the packet called chunks. This has the effect of reducing the size of the packet until that packet is small enough to be handled by the network in spite of the congestion. The chunks of the packets can be arranged in order of priority so that the most important information is preserved while the least important information is discarded during the packet wash operation. As a result, the most important information in a packet may still be successfully transmitted through the network instead of being dropped. Such a packet wash operation is not designed to operate on compressed images. An image may be compressed to a predetermined size at the time of encoding. For example, the encoding mechanism may arrange the compressed image data based on correlations between the data and not based on a priority. As an example, a JPEG can be partitioned into blocks and compressed by applying a transform to each of the blocks. However, the resulting data is arranged by block and not by priority. Accordingly, a packet wash operation may not be directly applied to an image data packet as the packet wash may be unable to determine which data can be discarded and which data should be maintained. Further, in some cases users may consider loss of quality in certain areas of an image to be more acceptable than in other areas of the image. Such targeted loss of quality may not be supported by example networks.

The present aspect includes a mechanism for applying a packet wash to an image data packet so that the image data packet can be reduced in size/quality as desired to avoid a complete packet drop. Further, the disclosed mechanism may accept a region of interest as in input. The image data packet can be arranged so that the packet wash reduces the size of the image data packet by dropping data relating to areas outside the region of interest. In this way, the image displayed to the user prioritizes quality in the region of interest over quality outside the region of interest. For example, an image data packet may include any type of image compressed by a transform. As a particular example, an image data packet may contain a JPEG compressed by employing a discrete cosine transform (DCT). In order to accomplish this mechanism, the compressed data in an image data packet is rearranged in order of priority. The image data is partitioned into blocks. A transform is applied to each block to transform each block of the image data as a series of quantization coefficients. The quantization coefficients are included in quality layers based on the effect such quantization coefficients have on the reconstructed image. Once the quantization coefficients are included in quality layers, the quantization coefficients can be included in an image data packet in order of a priority. A network node can then perform a packet wash by removing chunks and/or quality layers from the end of the packet. The most important quantization coefficients, as defined by the priority, are thereby preserved. For example, the priority may position quantization coefficients associated with blocks in a region of interest in front of blocks that are outside of the region of interest. Further, the priority may order the quantization coefficients based on quality layer. Accordingly, the image data packet is arranged by a desired priority to allow for dynamic reduction in quality of the image data as part of a packet wash operation. This allows a requestor to receive a requested image at a lower quality in case of network congestion instead of receiving nothing due to a complete packet drop. This mechanism may provide a better user experience. Further, this mechanism may allow the user to re-request that only dropped information be resent rather than resending the entire image, which would otherwise create additional network congestion. As such, the present mechanism creates additional functionality and reduces processor, memory, and/or network resource usage by an encoder, a content server, a decoder, and/or an intermediate network node in a communication network.

Optionally, in any of the preceding aspects, another implementation of the aspect provides, wherein the decoder is further configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 14 is a flowchart of another example method of decoding image data sorted based on a region of interest and processed by qualitative communication.

FIG. 15 is a diagram of an example system for applying qualitative communication to an image data packet based on a region of interest.

DETAILED DESCRIPTION

Figure 1:
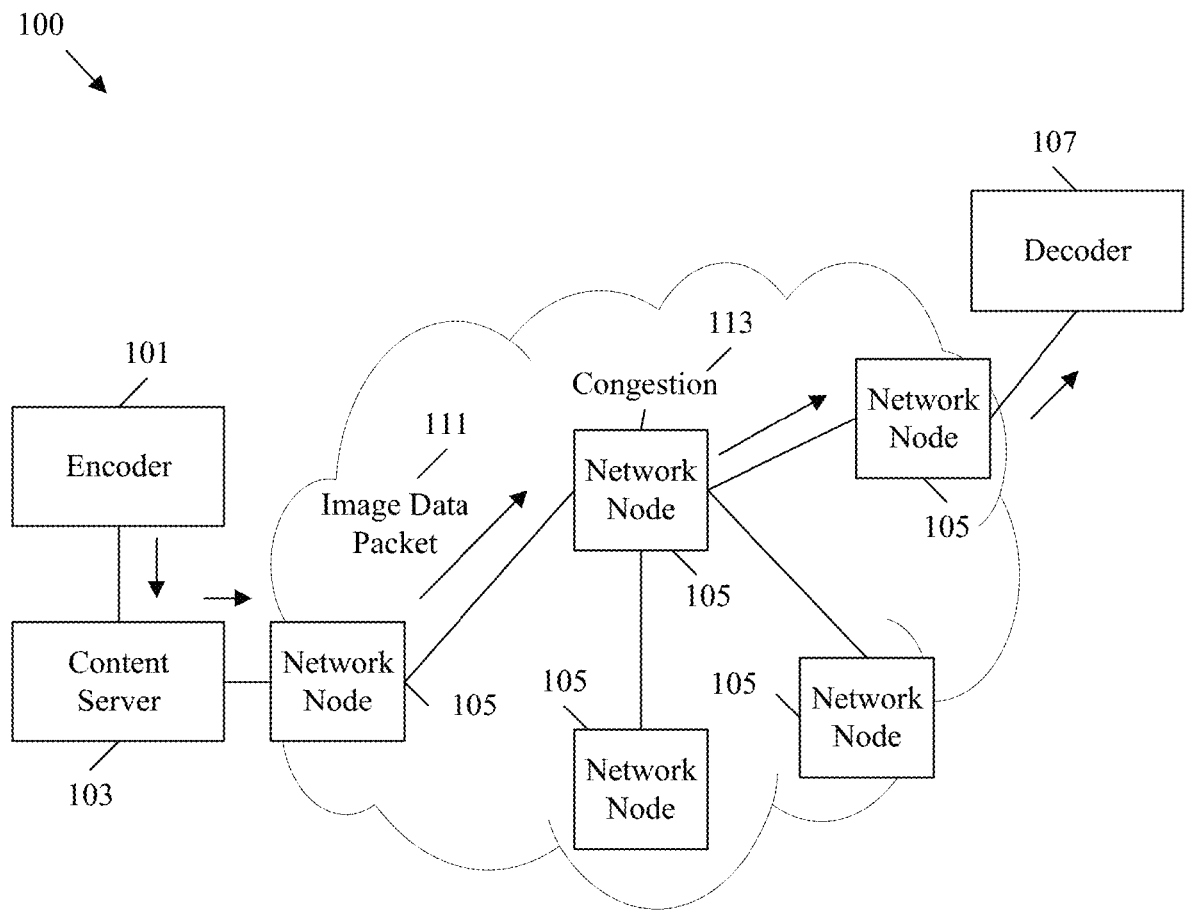
FIG. 1 is a diagram of an example network configured to perform qualitative communication.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following terms are defined as follows unless used in a contrary context herein. The following definitions are intended to provide additional clarity to the present disclosure. However, terms may be described differently in different contexts. Accordingly, the following definitions should be considered as a supplement and should not be considered to limit any other definitions of descriptions provided for such terms herein.

An encoder is any device capable of converting images into a compressed form for storage and/or transmission toward a decoder. Any such transmission may involve intermediate storage on a content server, which is a network device capable of storing data until such data is requested from an end user via a decoder. A decoder is any device capable of converting a compressed image file into a viewable image, for example for display to an end user. For example, a decoder may include any device that contains a web browser. A network node/device is any network device capable of receiving, handling, and/or transmitting a packet containing compressed image data. Image data is any data describing an image. An image is a visual representation of the external form of objects and/or of spaces. A reconstructed image is the result of compressing and decompressing an image with a lossy and/or a lossless process. A reconstructed image is identical to a corresponding image except for any loss in quality caused by lossy compression and/or attendant processing, storage, and/or transmission error. A block is a grouping of samples of an image (e.g., color and/or light values). A block may have a predetermined size, a relative position in an image, and may be used to support compression and/or decompression mechanisms. An interested object is a depicted item in an image that is either indicated by a user as interesting or is selected (e.g., by a content creator) as likely to interest a user (e.g., a face in an image). A region of interest is a portion of an image that contains an interested object. A region of interest may include a number of blocks and a location, which is a relative position of the region of interest in the image and/or reconstructed image. Further, an area outside the region of interest may contain a number of blocks equal to the number of blocks in the image minus the number of blocks in the region(s) of interest. A transform is any mechanism for consistently converting data into another form, such as a discrete cosine transform (DCT), a discrete sine transform (DST), a discrete Fourier transform (DFT), Karhunen-Loeve Transform (KLT), Haar transform, etc. Such transforms are digital transforms that convert from a spatial representation to a frequency map. For example, DCT is a transform that expresses a finite sequence of data points in terms of a sum of cosine functions at different frequencies. A frequency is a number of occurrences of a repeating event per a unit of time and/or distance. A coefficient, such as a quantization coefficient, can be a frequency component that partially describes a sequence of data points in a transformed frequency domain. Other types of coefficients are also possible. A region of interest quantization coefficient is any quantization coefficient describing a block included in the region of interest. A remaining quantization coefficient is any quantization coefficient describing a block excluded from/outside of the region of interest.

A quality layer is a grouping of quantization coefficients based on similarity of frequency and resulting effect on decompressed image quality. A chunk is a set of quantization coefficients. In some examples, a chunk is a set of quantization coefficients that are included in a single block and in a single quality layer. However, in some cases, a chunk can be defined to include multiple layers and/or multiple blocks. A layer is a group of quantization coefficients that have a similar effect on decompressed image quality. A most significant quality layer is a layer of quantization coefficients and/or chunks thereof that has a greatest effect on decompressed image quality. A least significant quality layer is a layer of quantization coefficients and/or chunks thereof that has a least effect on decompressed image quality. Image quality describes an amount of data loss (or lack thereof) when reconstructing an image compressed according to a lossy compression process. A priority is an indication of a level of importance for a corresponding item relative to other items. The least significant quality layer for an image data packet may change when a previously least significant quality layer is discarded. It should be noted that the terms significance, importance, and/or priority may be used interchangeably in some instance and all describe mechanisms for valuing some data over other data. A loss tolerance is data indicating an amount of data loss (e.g., minimum quality level) in a corresponding region that a requestor is willing to accept. Quantization coefficients in a most significant quality layer of a region of interest are quantization coefficients in the region of interest that are retained in order to meet a loss tolerance for the region of interest. Quantization coefficients in a less significant quality layer of a region of interest are quantization coefficients in the region of interest that provide quality in excess of the loss tolerance for the region of interest. Quantization coefficients in a most significant quality layer of a remaining region are quantization coefficients outside the region of interest that are retained in order to meet a loss tolerance outside the region of interest. Quantization coefficients in a less significant quality layer of a remaining region are quantization coefficients outside the region of interest that provide quality in excess of the loss tolerance outside the region of interest.

An image data packet is any network packet that contains compressed data representing an image. A checksum is a small sized portion of data derived from a block of digital data for the purpose of detecting errors occurring during transmission and/or storage. A metadata field is a field of data in a packet that provides information about other data (e.g., in the same packet). A number of remaining layers is data indicating a number of layers retained in a packet (e.g., corresponding to a region) by taking into account any layers that have been dropped, for example to reduce packet size to allow for transmission in light of network congestion. The number of remaining layers may be stored as metadata in a packet header when a packet wash process removes entire layers. When a packet wash process removes layers at each block, similar data may maintain the number of remaining layers for each block. A qualitative communication network is a network capable of performing partial packet drops to packets in transit in order to overcome network congestion. Congestion is a loss of service quality caused by a network node or link that has been assigned more data traffic than can be managed by the associated hardware. A packet drop is a mechanism for purposely discarding a packet during transmission through a network when relevant network resources are insufficient to respond to all demands placed on such network resources. A partial packet drop is a mechanism for dropping portions of a packet in order to allow a remainder of a packet to be transmitted when relevant network resources are insufficient to transmit the entire packet. A missing layer is a layer of image data (e.g., corresponding to a region) that is dropped as part of a partial packet drop.

Network qualitative communication is a network paradigm configured to mitigate data loss in a network due to network congestion. In a network configured for network qualitative communication, network nodes are configured to perform a packet wash operation. A packet wash is performed when a packet would otherwise be dropped due to network congestion. Instead of dropping the entire packet, the packet wash removes portions of the packet called chunks. This has the effect of reducing the size of the packet until that packet is small enough to be handled by the network in spite of the congestion. The chunks of the packets can be arranged in order of priority so that the most important information is preserved while the least important information is discarded during the packet wash operation. As a result, the most important information in a packet may still be successfully transmitted through the network instead of being dropped. Such a packet wash operation is not designed to operate on compressed images. An image may be compressed to a predetermined size at the time of encoding. For example, the encoding mechanism may arrange the compressed image data based on correlations between the data and not based on a priority. As an example, a JPEG image can be partitioned into blocks and compressed by applying a transform to each of the blocks. However, the resulting data is arranged by block and not by priority. Accordingly, a packet wash operation may not be directly applied to an image data packet as the packet wash may be unable to determine which data can be discarded and which data should be maintained. Further, in some cases users may consider loss of quality in certain areas of an image to be more acceptable than in other areas of the image. Such targeted loss of quality may not be supported by current systems.

Disclosed herein is a mechanism for applying a packet wash to an image data packet so that the image data packet can be reduced in size/quality as desired to avoid a complete packet drop. Further, the disclosed mechanism may accept a region of interest as in input. The image data packet can be arranged so that the packet wash reduces the size of the image data packet by dropping data relating to areas outside the region of interest. In this way, the image displayed to the user prioritizes quality in the region of interest over quality outside the region of interest. For example, an image data packet may include any type of image compressed by a transform. As a particular example, an image data packet may contain a JPEG compressed by employing a discrete cosine transform (DCT). In order to accomplish this mechanism, the compressed data in an image data packet is rearranged in order of priority. The image data is partitioned into blocks. A transform is applied to each block to transform each block of the image data as a series of quantization coefficients. The quantization coefficients are included in quality layers based on the effect such quantization coefficients have on the reconstructed image. For example, a DCT can be applied to a JPEG to create a matrix of quantization coefficients. The quantization coefficients on the top left of the matrix have the greatest effect on image quality and the quantization coefficients on the bottom right have the least effect on image quality. Once the quantization coefficients are included in quality layers, the quantization coefficients can be included in an image data packet in order of a priority. A network node can then perform a packet wash by removing chunks and/or quality layers from the end of the packet. The most important quantization coefficients, as defined by the priority, are thereby preserved.

For example, the priority may position quantization coefficients associated with blocks in a region of interest in front of blocks that are outside of the region of interest. Further, the priority may order the quantization coefficients based on quality layer. For example, all quantization coefficients related to the region of interest may be placed before any quantization coefficients related to blocks outside the region of interest. The quantization coefficients in the region of interest may be sorted by quality layer and the quantization coefficients outside the region of interest may be sorted by quality layer. This results in a packet that can receive a packet wash. The data outside the region of interest is dropped first as needed in an order based on quality layer. Then data inside the region of interest can also be dropped if needed in an order based on quality layer. In another example, a minimum quality can also be employed. For example, quality layers needed to meet the minimum quality for the region of interest can be positioned first in the image data packet. Quality layers needed to meet the minimum quality outside the region of interest can be positioned second in the image data packet. Remaining quality layers for the region of interest can be positioned third and remaining quality layers outside the region of interest can be positioned last. This results in reducing quality first outside the region of interest and then inside the region of interest as needed while maintaining a minimum quality for the entire image. In some examples, the minimum quality outside the region of interest can be removed if needed, while maintaining the minimum quality inside the region of interest. Accordingly, the image data packet is arranged by a desired priority to allow for dynamic reduction in quality of the image data as part of a packet wash operation. Stated differently, sorting quantization coefficients into layers allows a network node to dynamically and selectively perform targeted quality reduction on an image data packet in response to congestion instead of requiring that quality reduction to occur at an encoder prior to encoding. This allows a requestor to receive a requested image at a lower quality in case of network congestion instead of receiving nothing due to a complete packet drop. This mechanism may provide a better user experience. Further, this mechanism may allow the user to re-request that only dropped information be resent rather than resending the entire image, which would otherwise create additional network congestion. As such, the present mechanism creates additional functionality and reduces processor, memory, and/or network resource usage by an encoder, a content server, a decoder, and/or an intermediate network node in a communication network.

It should be noted that the disclosed mechanisms may perform a packet wash according to several different mechanisms. For example, a packet may be configured with multiple quality threshold tiers. A packet wash may then remove coefficients below the relevant thresholds until the packet is small enough to send. In addition, the disclosure below describes a region of interest and a remaining region. However, several regions of interest can be used within the scope of this disclosure. For example, a plurality of regions of interest can be employed with varying levels of priority. In some examples, a packet wash mechanism can remove coefficients from lower priority regions of interest before proceeding to remove coefficients from higher priority regions of interest. In addition, each region of interest may include a different threshold for layers that can be washed before proceeding to the next priority region of interest. In such a case, additional corresponding data can be added to the packet header in order to signal the various thresholds and remaining data to indicate the extent of packet wash that is performed by the network.

FIG. 1 is a diagram of an example network 100 configured to perform qualitative communication. The network 100 includes an encoder 101, a content server 103, a decoder 107, and a group of interconnected network nodes 105.

An encoder 101 is any computing device capable of converting raw image data into a compressed format for storage and/or transmission toward a decoder. For example, an encoder 101 may be configured to compress video and/or images into a compressed format for transmission over network 100. The encoder 101 can use a lossy or a lossless compression algorithm. A lossy compression algorithm reduces size, but loses data. A lossless compression algorithm loses no data to the compression process. As a result, reconstructed image data compressed by a lossless compression algorithm is identical to the original image file, while reconstructed image data compressed by a lossy compression algorithm approximates the original image file. As an example, an encoder 101 can apply a transform, such as a DCT, to image data, such as a JPEG, to create a series of quantization coefficients at various frequencies. These quantization coefficients can be included in an image data packet 111 for transmission toward a decoder 107 for reconstruction into the original image data. Use of a transform, such as DCT, for compression is a lossy algorithm that approximates the original data. The amount of lost data depends on the number of quantization coefficients employed, with fewer quantization coefficients resulting in more lost data. It should be noted that a small amount of lost data may be imperceptible to a human observer, while a large amount of lost data may be clearly perceived by the end user. As such, the encoder 101 may be configured to employ a number of quantization coefficients that balances processor, memory, and/or network resources with expected user sensitivity to data loss (for example, such that there is no perceptible data loss to the human user).

A content server 103 is a computing device capable of storing data and making such data available to other network devices upon request. For example, a content server 103 may receive compressed image data and/or image data packets 111 from an encoder and store such data until such data is requested by a decoder 107. For example, a prerecorded video and/or image file (e.g., in a web page and/or web-based software) may be stored in the content server 103. The content server 103 may transmit an image data packet 111 containing such data to a decoder 107 upon request. A content server 103 is optional equipment. For example, an encoder 101 that live streams content may transmit such content directly to a decoder 107. As an example, an encoder 101 being used as part of a teleconference may transmit image data packets 111 to the decoder 107 in real time without employing a content server 103. When used, the content server 103 stores compressed image data, receives a request for image data, and transmits an image data packet 111 on behalf of the encoder 101. In another example, an encoder 101 can be included on the content server 103.

A decoder 107 is any computing device capable of converting a compressed image data file into a raw image data, for example, for display/playback to an end user. For example, a decoder 107 may include any device that contains a web browser. The decoder 107 is configured to request image data from the encoder 101 and/or the content server 103 via network nodes 105. The decoder 107 can then receive the image data packet 111 (or multiple image data packets 111) containing the requested image data, decode the image data packet 111 to reconstruct the image data, and display the image data to a user. For example, the image data displayed to the user may include static image(s), such as JPEGs, video including multiple images, or combinations thereof. During reconstruction, the decoder 107 can obtain quantization coefficients from the image data packet 111. The decoder 107 can also employ an inverse transform, such as an inverse DCT, to reconstruct the image data, with any associated compression losses, from the image data packet 111.

The image data packet 111 is any network packet that contains compressed data representing an image, such as video, static images, etc., or a portion thereof. For example, an image may be broken into multiple image data packets 111 in some cases. In the event a transform is used to compress the image data, the image data packet 111 comprises quantization coefficients that represent image data in a compressed form. The image data packet 111 may also include headers, checksums, and/or metadata. Hence, the image data packet 111 contains image data, data describing the image data, data describing how the image data packet 111 should be handled, data used for error checking, etc.

The image data packet 111 and any associated requests are communicated between the encoder 101, the decoder 107, and/or the content server 103 via a network of network nodes 105. A network node 105 is any network device capable of receiving, handling, and/or transmitting a packet containing compressed image data, such as image data packet 111. As an example, the network nodes 105 are configured to transmit a request for image data from the encoder 101 to the content server 103 and/or decoder 107. Further, the network nodes 105 are configured to transmit the image data packet 111 from the encoder 101 and/or content server 103 to the decoder 107.

The network nodes 105 may communicate many flows of data simultaneously. In some cases, an overused network node 105 may experience congestion 113. Congestion 113 describes a scenario where a network node 105 or associated link is directed to communicate more network traffic than is supported by the associated hardware. For example, congestion 113 may occur when a network node 105 begins receiving traffic faster than the network node 105 can process that traffic. Congestion 113 can also occur when the network node 105 is directed to transmit more data over a specified output port and/or link than a maximum bandwidth capacity of the output port and/or link. A network node 105 can manage congestion 113 by storing packets until additional bandwidth is available. However, memory on a network node 105 is a finite resource and can become overloaded if the congestion 113 becomes severe and/or is consistent over an extended period. Once the network node 105 exceeds both communication bandwidth and memory capacity, the network node 105 may be forced to begin dropping packets. A packet drop is a mechanism for purposely discarding a packet during transmission through a network when relevant network resources are insufficient to respond to all demands placed on such network resources.

In some networks, packet drops result in data becoming lost. However, network 100 is configured to employ network qualitative communication. Network qualitative communication is a network paradigm configured to mitigate data loss in a network 100 due to network congestion 113. In a network 100 configured for network qualitative communication, network nodes 105 are configured to perform a packet wash operation. A packet wash is performed when a packet would otherwise be dropped due to network congestion 113. Instead of dropping the entire packet, the packet wash removes portions of the packet called chunks. This has the effect of reducing the size of the packet until that packet is small enough to be stored and/or transmitted by the network node 105 in spite of the congestion 113. The chunks of the packets can be arranged in order of priority so that the most important information is preserved while the least important information is discarded during the packet wash operation. As a result, the most important information in a packet may still be successfully transmitted through the network 100 instead of being dropped.

Further, network 100 is configured to employ network qualitative communication principles when transmitting an image data packet 111. Other networks are unable to perform a packet wash on an image data packet because the quality, and hence the size, of an image data packet is set when the image data is encoded/compressed. The image data is partitioned into blocks and compressed by a transform resulting in a group of quantization coefficients for each block. Other networks organize compressed image data by positioning all quantization coefficients corresponding to a block in adjacent positions in a packet. As such, the quantization coefficients are indistinguishable from a priority standpoint, and hence are either all dropped or all transmitted.

Network 100 is altered to address this problem. The encoder 101 and/or content server 103 can organize quantization coefficients into quality layers based on the effect such quantization coefficients have on the reconstructed image. When image data packet 111 is generated, the quantization coefficients are sorted based on quality layer instead of based on which block the quantization coefficients describe. Accordingly, the image data packet 111 includes a highest quality layer at the start of the packet payload. Subsequent quality layers have progressively less effect on the quality of the reconstructed image data, and are positioned progressively closer to the end of the packet payload. The lowest quality layer is positioned at the end of the payload of the image data packet 111. Further, the image data in the image data packet 111 can be positioned based on a region of interest. For example, quantization coefficients related to areas of the image that are likely to be more important to a user can be placed at the start of the packet. Because the image data packet 111 is organized in this fashion, a network node 105 experiencing congestion 113 can perform a packet wash by incrementally dropping chunks and/or quality layers from the back of the image data packet 111 until the image data packet 111 is small enough to be stored and/or transmitted. As a result, the image data packet 111 is washed and transmitted at lower quality instead of being dropped due to congestion 113. Further, the image data packet 111 may include portions of an image related to a region of interest at a higher quality than other portions of the image.

Figure 2:
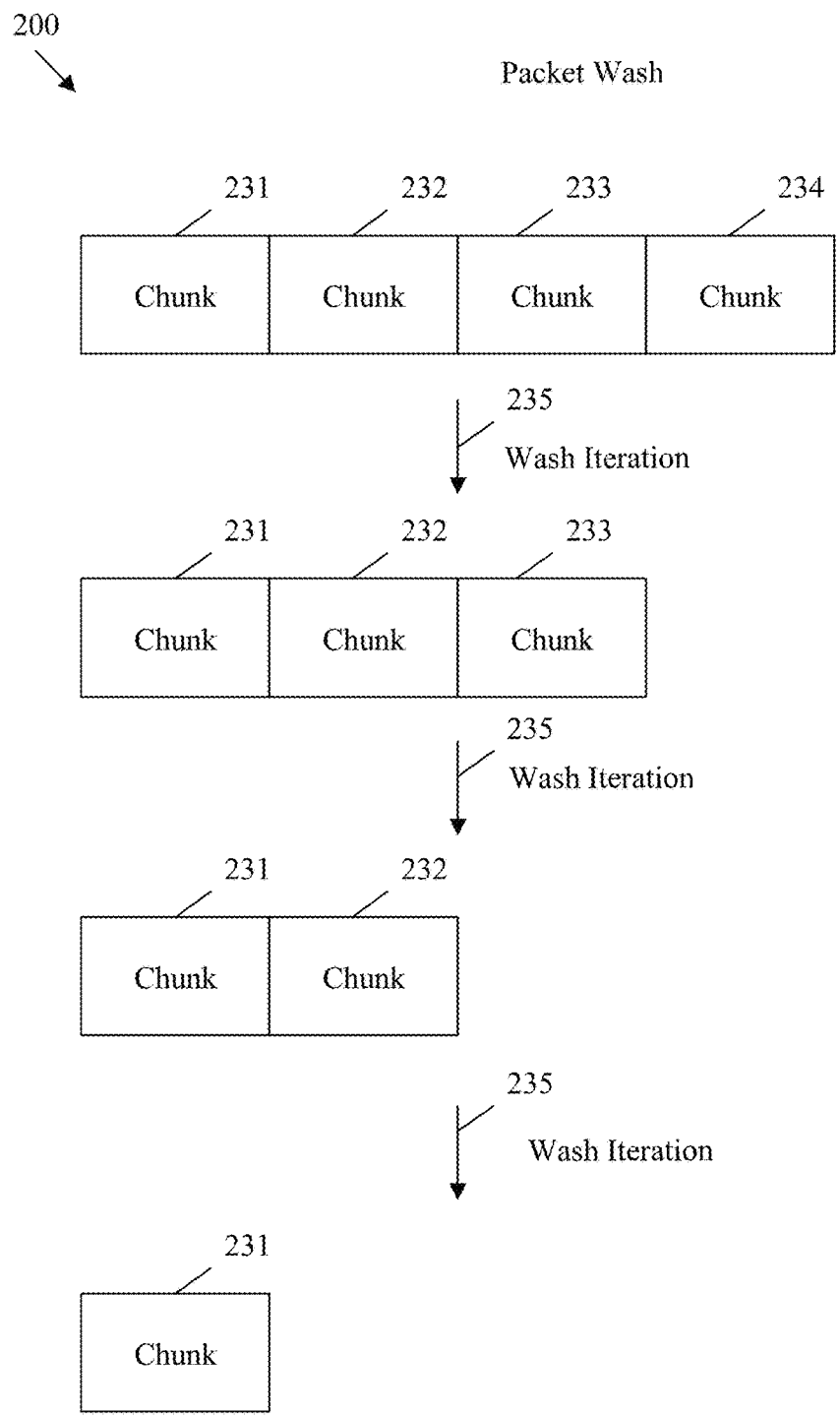
FIG. 2 illustrates an example mechanism of performing a packet wash to support qualitative communication.

FIG. 2 illustrates an example mechanism of performing a packet wash 200 to support qualitative communication. Packet wash 200 may be employed by a network node 105 in network 100. Packet wash 200 is applied to a packet, such as image data packet 111, which may include chunk 231, chunk 232, chunk 233, and chunk 234. The chunks 231-234 contain data arranged in order of decreasing priority with highest priority chunks toward the front of the packet and lowest priority chunks toward the end. When congestion occurs, packet wash 200 begins to incrementally drop chunks from the end of the packet unit the packet is smaller than a current bandwidth availability. The packet can then be transmitted using the bandwidth availability. Bandwidth availability may include a measurement of memory available to store the packet unit the packet can be transmitted, a measurement of transmitter resources available to transmit the packet, a measurement of link availability to carry the packet from the node, or combinations thereof.

For example, the packet wash 200 can perform a wash iteration 235 by dropping the lowest priority chunk 234 from the end of the packet payload. In the event that the packet is still too large to be stored/transmitted, the packet wash 200 can perform another wash iteration 235 by dropping the lowest priority chunk 233 from the end of the packet payload. In the event that the packet is still too large to be stored/transmitted, the packet wash 200 can perform another wash iteration 235 by dropping the lowest priority chunk 232 from the end of the packet payload. In the event that a packet containing a single chunk 231 cannot be transmitted, the packet can be entirely dropped. Further, the packet can contain metadata indicating a minimum acceptable quality for the packet. The entire packet can also be dropped when dropping a chunk 232-234 would reduce the quality of the packet below the minimum acceptable quality. By arranging chunks of quantization coefficients by region of interest and/or quality layer instead of by block position, image data can be arranged in order of priority so that packet wash 200 can be applied to an image data packet. It should be noted that, as described in more detail below, a chunk 231-234 of an image data packet is a set of quantization coefficients included in a single block in a single quality layer. It should be noted that the disclosed mechanisms are also described in International Application number PCT/US20/63883 filed Dec. 9, 2020 by Lijun Dong, et. al., and titled "Media Packetization For Network Qualitative Communication", which is hereby incorporated by reference.

Figure 3:
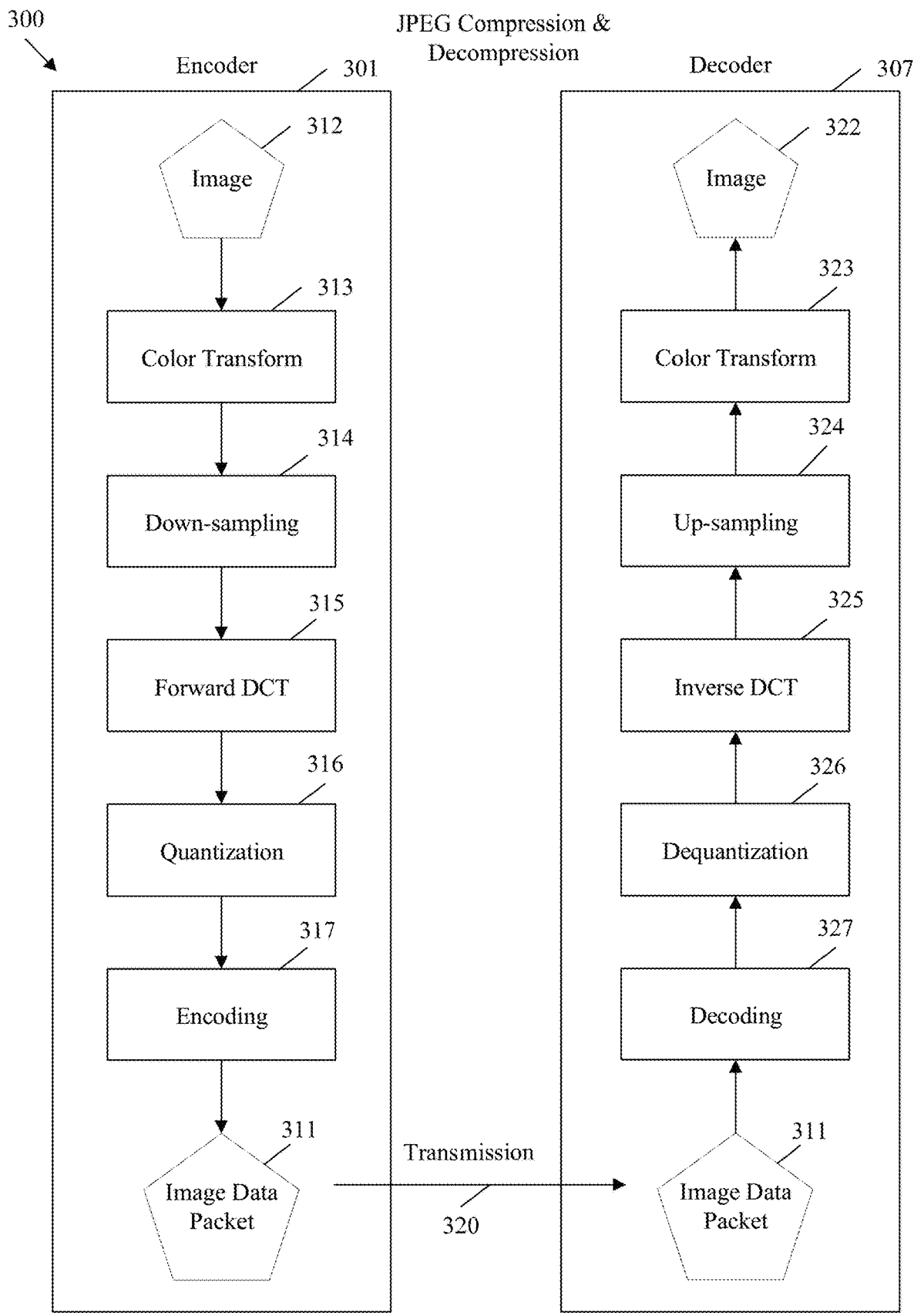
FIG. 3 is a diagram of an example system for JPEG compression and decompression.

FIG. 3 is a diagram of an example system 300 for JPEG compression and decompression. JPEG is an example of image data that can be included in an image data packet, such as image data packet 111, for application of a packet wash 200. The disclosed mechanisms work for many types of image data. However, JPEG provides a clear example of how such mechanisms function. These mechanisms can operate in a similar manner on any image that employs a transform to compress image data into quantization coefficients.

System 300 employs an encoder 301 and a decoder 307, which may be substantially similar to encoder 101 and decoder 107, respectively. The encoder 301 receives an image 312, which may be any representation that depicts visual perception. A color transform 313 is applied to the image 312. The color transform 313 changes the image 312 from a red, blue, and green (RGB) color space into a luminance, blue difference chrominance, and red difference chrominance ($YC_BC_R$) color space. Color transform 313 may be an optional step in some systems. However, images in the $YC_BC_R$ color space can be compressed to a greater degree than images in the RGB space without a significant effect on perceptible image quality.

Down-sampling 314 can then be applied to the image 312. The human eye can more easily detect changes in luminance than in chrominance. As such, down-sampling 314 reduces the spatial resolution of the $C_B$ and $C_R$ components without changing the spatial resolution of the Y components. This compresses the image 312 without a significant loss of perceptible image quality.

A forward DCT 315 is then applied to the image. The forward DCT 315 is applied separately to each of the Y, $C_B$, and $C_R$ components. The forward DCT 315 represents a block of image data, for example an eight by eight block of pixels, as a series of quantization coefficients. The pixel values change in the spatial domain at various rates depending on the particular image. The forward DCT 315 is a transform that expresses a finite sequence of data points in terms of a sum of cosine functions at different frequencies. Accordingly, the quantization coefficients express modifiers for cosine functions at corresponding frequencies that should be added together to fit the forward DCT 315 to the pixel value changes in the spatial domain. As a result, the quantization coefficients describe pixel value changes for a corresponding component in a frequency domain. A quantization coefficient may be formally defined as a horizontal and/or vertical frequency component that partially describes a sequence of data points in a transformed frequency domain. In an example, a component (e.g., Y, $C_B$, or $C_R$) of an eight by eight block of pixels can be represented by an eight by eight matrix containing sixty-four quantization coefficients. As such, each eight by eight block of pixels can be represented by three sets of sixty-four quantization coefficients.

Quantization 316 can be applied to the quantization coefficients. The human eye easily distinguishes low frequency component changes, but generally has trouble with high frequency component changes. As such, quantization 316 replaces actual values of high frequency quantization coefficients with zeros. As an example, the quantization coefficients can be divided by a constant in the frequency domain and rounded to the nearest integer, which generally results in rounding higher frequency components to zero. Quantization 316 can reduce file size without having a significant effect on perceptible image quality. However, quantization 316 can begin to effect image quality as an increasing number of lower frequency components are rounded to zero. As such, the level of quantization 316 is selected to balance between file size loss of image quality.

Encoding 317 can then be applied to quantization coefficients. For example, entropy coding can be employed to compress the quantization coefficients. Example entropy coding schemes may include arithmetic coding, Huffman coding, or other coding schemes. Entropy coding may compress data by replacing values with code words that are smaller than the actual values and that remove duplicate values in a predictable manner. The encoded quantization coefficients can then be placed in an image data packet 311.

Transmission 320 can be employed to forward the image data packet 311 to the decoder 307, for example in a manner substantially similar to image data packet 111 in network 100. The decoder 307 employs an inverse of the process used by the encoder 301. This converts the image data packet 311 into an image 322. The image 322 is substantially similar to image 312. However, image 322 is affected by the lossy compression used to create the image data packet 311. As such, the image 322 is of lower quality than the image 312. The amount of the quality loss depends primarily on the number of quantization coefficients removed during quantization 316.

The decoder 307 applies decoding 327 to the image data packet 311. Decoding 327 is selected to reverse the process of encoding 317. As such, decoding 327 employs an entropy-based algorithm that converts code words back to quantization coefficients. The particular algorithm used by decoding 327 is selected based on the algorithm used by encoding 317 to ensure that the encoding process 317 is exactly (and losslessly) reversed by decoding 327.

Dequantization 326 can be applied to the decoded quantization coefficients. Dequantization 326 can reverse some of loss caused by the quantization 316. For example, dequantization 326 may multiply the quantization coefficients by a constant in the frequency domain. This reverses data changes to quantization coefficients that have not been rounded to zero. However, such multiplication may have no effect on the zero quantization coefficients.

An inverse DCT 325 is applied to convert the quantization coefficients back into Y, $C_B$, and $C_R$ component values. The inverse DCT 325 may be selected based on the forward DCT 315. The inverse DCT 325 is applied to each of the components (e.g., three per block) to convert the data from the frequency domain back to the spatial domain, which results in an image 322. The decoder 307 can then perform up-sampling 324 on the image 322 to reverse the down-sampling 314. Up-sampling 324 may increase the resolution of the chrominance components to match the resolution of the luminance components. The decoder 307 can also apply a color transform 323 to convert the image 322 from the $YC_BC_R$ color space back to an RGB color space. The result is a reconstructed image 322 that approximates image 312 minus any data loss due to compression (e.g., quantization 316).

Figure 4:
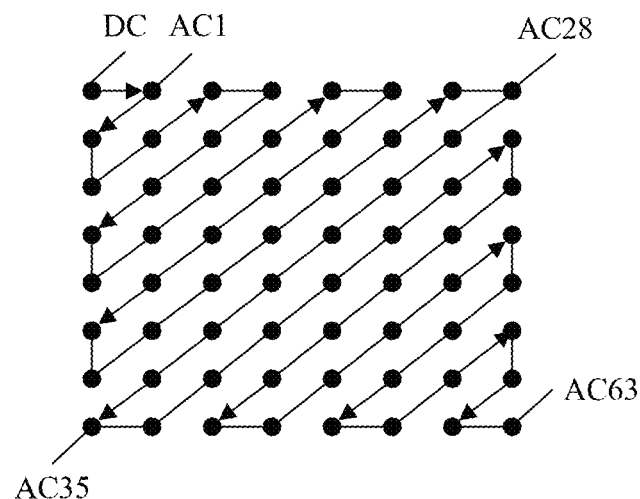
FIG. 4 is a diagram illustrating an example set of quantization coefficients generated to represent a block of an image.

FIG. 4 is a diagram illustrating an example set of quantization coefficients 400 generated to represent a block of an image. For example, quantization coefficients 400 may be created when a forward DCT 315 is applied to an image. The resulting quantization coefficients 400 may be encoded into a chunk of an image data packet 111 for transmission through a network 100 and subjected to a packet wash 200.

The quantization coefficients 400 are entropy coded. FIG. 4 depicts an application of Huffman coding to the quantization coefficients 400. The quantization coefficients 400 are denoted based on a corresponding frequency. As shown, the first quantization coefficient 400 at the top left of the block is denoted as a direct current (DC) coefficient. Further quantization coefficients 400 are denoted as alternating current (AC) with a number. The quantization coefficients 400 include DC and AC1 through AC63. The quantization coefficients 400 are numbered in a zig zag pattern (shown by arrows) based on corresponding frequencies. The result is a mechanism for grouping quantization coefficients 400 by frequency and hence by how much the quantization coefficients 400 effect the visual quality of the reconstructed image. The Huffman coding algorithm uses codewords to represent the quantization coefficients 400 in the order shown. The codewords remove any redundancies. For example, when AC components that are adjacent in the zig zag order share the same value, then the same codeword can represent all of such AC components. This is particularly useful when the quantization process rounds many of the adjacent quantization coefficients 400 to a value of zero. Huffman coding is described herein as applied to a block of a JPEG image. However, Huffman coding may be applied to many other types of images, such as video images, as well. Further, Huffman coding is depicted as an example of a type of entropy coding. Other types of entropy coding may also be used to compress an image that has been transformed into blocks of quantization coefficients 400.

Figure 5:
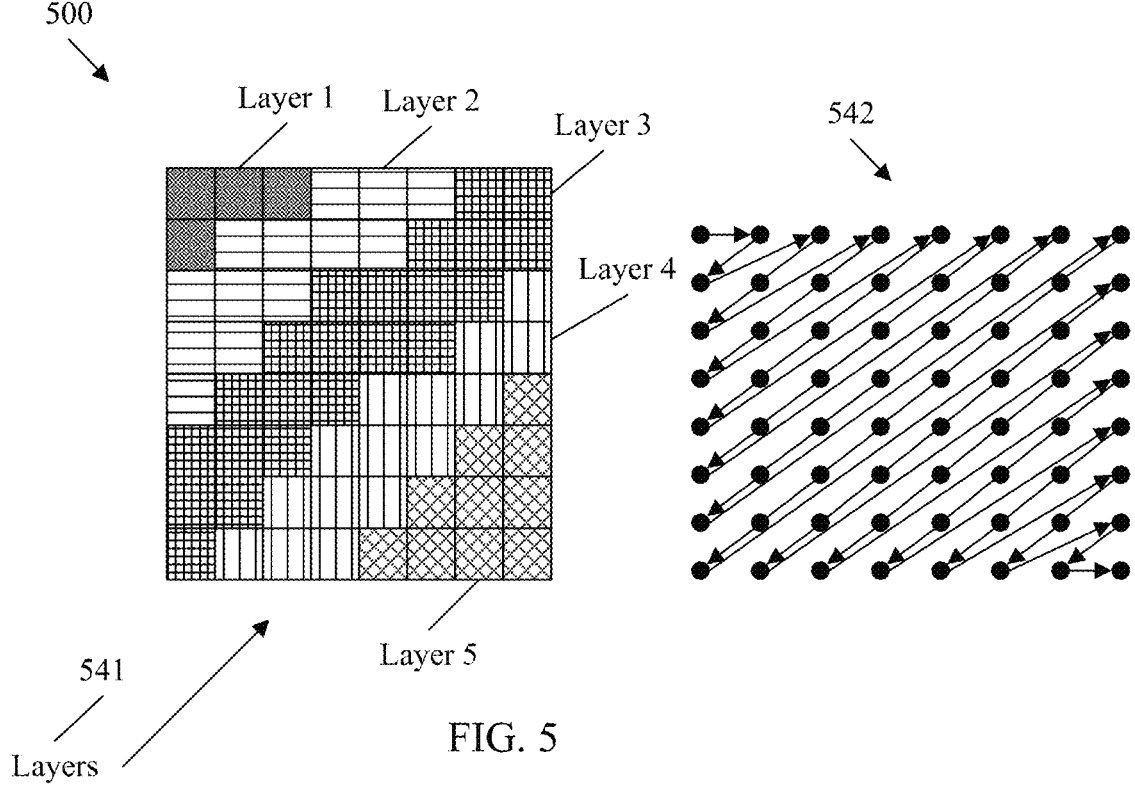
FIG. 5 is a diagram illustrating an example mechanism for grouping quantization coefficients for a block into layers based on corresponding effects on image quality.

FIG. 5 is a diagram illustrating an example mechanism 500 for grouping quantization coefficients for a block into quality layers 541 based on corresponding effects on image quality. For example, mechanism 500 can be applied by an encoder 101 and/or a content server 103 in network 100 when creating an image data packet 111. Mechanism 500 allows packet wash 200 to be applied to an image data packet 111. Further, mechanism 500 can be applied by an encoder 301 after application of a forward DCT 315 and/or quantization 316 and prior to encoding 317, and hence prior to application of entropy coding to quantization coefficients 400.

Mechanism 500 sorts quantization coefficients into quality layers 541, which allows a packet wash to remove layers from a packet. Stated differently, mechanism 500 sorts quantization coefficients so a network node can dynamically perform quality reduction on an image data packet in response to congestion instead of requiring that quality reduction occur at an encoder prior to encoding. As used herein, a quality layer 541 is a grouping of quantization coefficients based on similarity of frequency and resulting effect on decompressed image quality. As noted above, quantization coefficients have a reduced effect on image quality at higher frequencies. When a block of quantization coefficients is traversed in a zig zag pattern from a top left to a bottom right, the quantization coefficients have incrementally less effect on image quality as the traversal proceeds toward the bottom right.

As an example, mechanism 500 can select a number of quantization coefficients to position in each layer. Mechanism 500 can then traverse the block of quantization coefficients in a zig zag pattern 542. Zig zag pattern 542 begins at the top position of a first column of a matrix and proceeds to a top position of a second column of the matrix. The zig zag pattern 542 then repeatedly proceeds in a diagonal direction until the left most unvisited position is reached before returning to a top right unvisited position until the entire matrix is traversed. While traversing the matrix in zig zag pattern 542, mechanism 500 assigns the coefficients into a current layer until a predetermined number of coefficients for the current layer is reached. The mechanism 500 then proceeds to the next layer until all coefficients are assigned. In the example shown, the quantization coefficients are assigned into five layers. However, any number of layers can be employed. Further, other zig zag patterns may be employed, such as the zig zag pattern employed in entropy coding as applied to quantization coefficients 400. Regardless of the particular algorithm employed, mechanism 500 sorts the quantization coefficients into quality layers 541 based on frequency such that the quality layers 541 have a decreasing effect on image quality upon reconstruction.

Figure 6:
FIG. 6 illustrates an example image including a region of interest.

FIG. 6 illustrates an example image 600 including a region of interest 647. As used herein, an image 600 is a visual representation of the external form of objects and/or of spaces. The image 600 can be represented as image data, which can be any data describing an image 600. For example, image 600 can be encoded as quantization coefficients 400 according to mechanism 500 by an encoder 101 and/or 301 and decoded by a decoder 107 and/or 307. Hence, the image 600, as encoded, can be subject to a packet wash 200 during transmission over a network 100 prior to reconstruction.

The image 600 includes a region of interest 647 and a remaining region 649. The region of interest 647 is a portion of an image 600 that contains an interested object. An interested object is a depicted item in image 600 that is either indicated by a user as interesting or is selected, for example by a content creator or an algorithm as likely to interest a user. In the present example, the interested object is a face. The region of interest 647 contains the group of blocks that contain the interest object, in this case the face, as depicted by the bold oval over the image 600. The region of interest 647 is also associated with a position. In this case, the position of the region of interest 647 is generally in the center of the picture. The position of the region of interest 647 can be defined by the position of the blocks contained in the region of interest 647 relative to the image 600 as a whole. The remaining region 649 contains any blocks that are not included in the region of interest 647. As such, the region of interest 647 can be positioned in the image 600 relative to the remaining region 649. For example, the image 600 contains a number of blocks, and hence the number of blocks in the region of interest 647 plus the number of blocks in the remaining region 649 equals the number of blocks in the image 600. Further, the position of the blocks in the region of interest 647 can be determined based on the relative position of the blocks in the remaining region 649.

As an example, a user may indicate that quality for an interested object in the region of interest 647 is more important than quality in the remaining region 649. As another example, a content creator and/or an algorithm may determine that a user is likely to find quality degradation in the remaining region 649 to be more acceptable than degradation of quality in the region of interest 647 due to the presence of the interested object. This assumption can be made as humans are known to notice changes in faces more than in other objects. As such, a user, a creator, and/or an algorithm can determine/select the presence and/or location region(s) of interest. Further, a user, a creator, and/or an algorithm can determine/select an order of priority between regions that indicates the relative value of visual quality between regions. Hence a user, a creator, and/or an algorithm can indicate whether quality degradation is more acceptable in some region(s) than in other region(s). Accordingly, the present disclosure allows for different prioritization in the region of interest 647 and the remaining region 649. The entire image 600 can be transformed into coefficients. The coefficients can also be assigned to layers, for example according to mechanism 500. Further, layers of coefficients for the blocks in the region of interest 647 can be given different priority than coefficients for the blocks in the remaining region 649. For example, all of the layers of coefficients for the blocks in the region of interest 647 can be positioned in an image packet prior to any layers of coefficients for blocks in the remaining region 649. In this way, a packet wash removes quality from the remaining region 649 prior to removing any quality from the region of interest 647. The position of the region of interest 647 can be coded in the bitstream in order to allow the region of interest 647 to be placed in the image 600 in the event that all of the coefficients from the remaining region 649 are removed by a packet wash.

In another example, a lower tolerance for quality can be specified for both the region of interest 647 and the remaining region 649. In such a case, the coefficients needed to meet the lower tolerance for region of interest 647 can be placed first in an image data packet followed by the coefficients needed to meet the lower tolerance for the remaining region 649. These can be followed by any remaining coefficients for the region of interest 647 and then any remaining coefficients for the remaining region 649. In this way, the remaining region 649 is degraded first by the packet wash until a minimum quality is reached for the remaining region 649. Then the region of interest is degraded by the packet wash, if needed, until a minimum quality is reached for the region of interest 647. Depending on the example, the image packet may be dropped rather than violate the lower tolerance for the remaining region 649. However, some examples may then drop any remaining coefficients from the remaining region 649 in quality layer order if needed in order to preserve any remaining coefficients in the region of interest 647. In some examples, the total number of layers for the region of interest 647 and the remaining region 649 can be included in the image data packet in order to allow a decoder to request that any quality layers lost to the packet wash process be retransmitted.

This mechanism allows a requestor to receive requested image 600 at a lower quality in case of network congestion instead of receiving nothing due to a complete packet drop. This mechanism may provide a better user experience. Further, this mechanism may allow the user to re-request that only dropped information be resent rather than resending the entire image, which would otherwise create additional network congestion. As such, the present mechanism creates additional functionality and reduces processor, memory, and/or network resource usage by an encoder, a content server, a decoder, and/or an intermediate network node in a communication network. The following figures discuss such mechanisms in greater detail.

Figure 7:
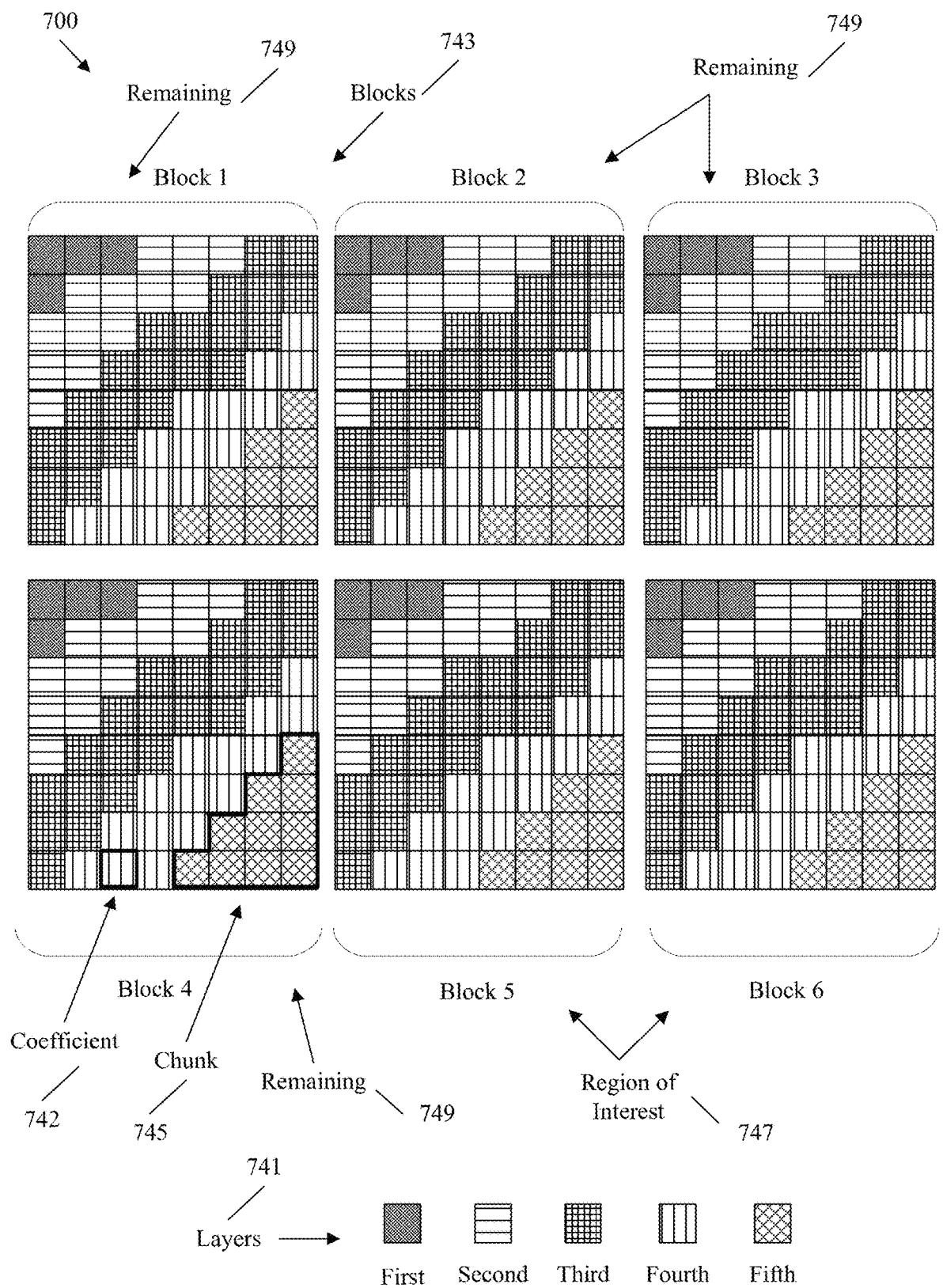
FIG. 7 is a diagram illustrating an example image data with quantization coefficients grouped into layers and chunks.

FIG. 7 is a diagram illustrating an example image data 700 with quantization coefficients 742 grouped into layers 741 and chunks 745. For example, mechanism 500 can be applied to an image 600 to obtain image data 700. As such, image data 700 can be encoded by an encoder 101 and/or by a content server 103 in network 100 in order to create an image data packet 111. Image data 700 is grouped to allow a packet wash 200 to be applied to an image data packet 111. For example, image data 700 can be sorted by an encoder 301 after application of a forward DCT 315 and/or quantization 316 and prior to encoding 317, and hence prior to application of entropy coding to quantization coefficients 400.

Mechanism 500 is shown as being applied to a single block of an image (e.g., JPEG), and/or a frame of a video. Image data 700 results when mechanism 500 is applied to multiple blocks 743 of content, for example from an image 600 with both a region of interest 647 and a remaining region 649. While image data 700 may include many blocks 743, six blocks 743 are shown in FIG. 7 to illustrate the concept. For example, image data 700 can be partitioned into blocks 743 prior to application of a transform, and the resulting quantization coefficients 742 can be assigned/sorted into quality layers 741. A block 743 is a grouping of samples of a predetermined size that are selected by partitioning in order to support compression and/or decompression mechanisms. For example, a sample may be color and/or light values in an image. In a JPEG, a block 743 generally includes a group of sixty-four samples (e.g., an eight by eight block of a component, such as Y, $C_b$, or $C_r$). Quality layers 741 may be substantially similar to quality layers 541. Hence, a quality layer 741 is a grouping of quantization coefficients 742 based on similarity of frequency and resulting effect on decompressed image quality.

As shown, a quality layer 741 includes quantization coefficients 742 of a similar frequency across multiple blocks 743. The quality layers 741 can also be arranged into chunks 745. In some examples, a chunk 745 is a set of quantization coefficients 742 that are included in a single block 743 and in a single quality layer 741. However, in some cases a chunk 745 may be organized to include multiple blocks 743, multiple quality layers 741, or both. In the example shown, six blocks 743 are present with quantization coefficients 742 grouped into five quality layers 741. Accordingly, each quality layer 741 includes a number of chunks 745 equal to the number of blocks 743, in this example six. Further, each block 743 includes a number of chunks 745 equal to the number of quality layers 741, in this example five.

In this example, the image data 700 includes blocks 743 that are included in a region of interest 747 and blocks 743 that are included in a remaining region 749. The region of interest 747 and remaining region 749 may be substantially similar to the region of interest 647 and remaining region 649, respectively. For example, blocks 5-6 may include data that depicts a portion of an interested object, such as the face inside the oval as depicted in FIG. 6. Therefore, blocks 5-6 are included in the region of interest 647. Further, blocks 1-4 may include data that depicts a portion of an image that does not include any part of an interested object, such as the area outside the oval as depicted in FIG. 6. Therefore, blocks 1-4 are included in the remaining region 749 and not in the region of interest 647. Once the quantization coefficients 742 have been sorted into chunks 745 and/or quality layers 741 and associated with a region of interest 747 and/or a remaining region 749, the quantization coefficients 742 can be positioned into an image data packet to support a packet wash.

Figure 8:
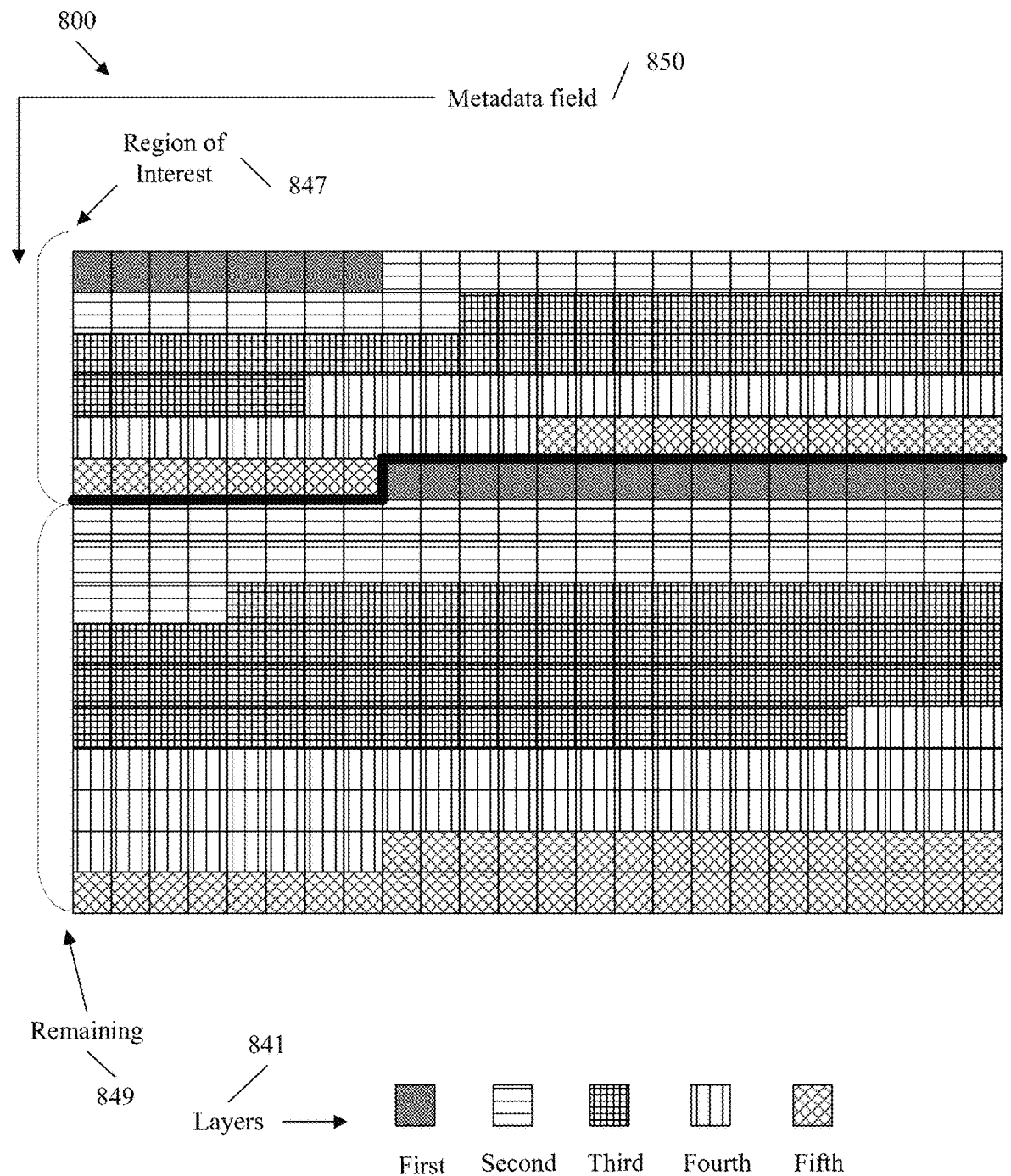
FIG. 8 is a diagram illustrating an example image data packet encoding containing quantization coefficients positioned according to a first example sorting mechanism based on both region of interest and effect on quality instead of based on location in the image data.

FIG. 8 is a diagram illustrating an example image data packet 800 encoding containing quantization coefficients positioned according to a first example sorting mechanism based on both region of interest 847 and effect on quality instead of based on location in the image data. Image data packet 800 is an encoding based on image data 700. As such, image data packet 900 may represent image 600. Accordingly, mechanism 500 can be applied to image data 700 prior to encoding image data packet 800. Further, image data packet 800 can be encoded by an encoder 101 and/or by a content server 103 in network 100, and hence is an example of an image data packet 111. Image data packet 800 contains quantization coefficients positioned to allow a packet wash 200 to be applied to the image data packet 800. For example, image data packet 800 can be encoded by an encoder 301 for transmission 320 as an example of an image data packet 311. Hence, image data packet 800 may be coded according to entropy coding as described with respect to quantization coefficients 400.

As shown in FIG. 7, the quantization coefficients of image data 700 are sorted in order of the blocks that contain such image data 700. In contrast, the quantization coefficients of image data packet 800 have been sorted/assigned based on both quality layer 841 and whether corresponding blocks are included in the region of interest 847 or the remaining region 849. The quality layers 841, region of interest 847, and remaining region 849 are substantially similar to quality layers 741, region of interest 747, and remaining region 749, but positioned in a different order to support application of a packet wash, such as packet wash 200.

In the present example, the quantization coefficients for each block can be sorted into quality layers 841. All of the blocks that are included in the region of interest 847 are positioned at the front of the image data packet 800. Further, the quantization coefficients for the region of interest 847 are positioned in order based on quality layer 841. In the example shown, all of the first quality layer coefficients for blocks 5-6 are positioned first, the second quality layer coefficients for blocks 5-6 are positioned second, the third quality layer coefficients for blocks 5-6 are positioned third, the fourth quality layer coefficients for blocks 5-6 are positioned fourth, and the fifth quality layer coefficients for blocks 5-6 are positioned fifth. In this way, a packet wash process proceeding from the back of the packet towards the front of the packet drops image data layer by layer, or chunks thereof, from the coefficients that have the least effect on the image quality of the region of interest 847 to coefficients that have a greatest effect on the image quality of the region of interest 847.

The blocks in the remaining region 849, in this example blocks 1-4, are positioned in the image data packet 800 after the blocks related to the region of interest 847. The quantization coefficients for the remaining region 849 are also positioned in order based on quality layer 841. In the example shown, all of the first quality layer coefficients for blocks 1-4 are positioned sixth, the second quality layer coefficients for blocks 1-4 are positioned seventh, the third quality layer coefficients for blocks 1-4 are positioned eighth, the fourth quality layer coefficients for blocks 1-4 are positioned ninth, and the fifth quality layer coefficients for blocks 1-4 are positioned tenth. In this way, a packet wash process proceeding from the back of the packet towards the front of the packet drops image data layer by layer, or chunks thereof, from the coefficients that have the least effect on the image quality of the remaining region 849 to coefficients that have a greatest effect on the image quality of the remaining region 849. Further, the quality of the remaining region 849 is always reduced prior to reducing any quality in the region of interest in this example.

The encoder and/or a content server can encode the image data packet 800 as described above. The image data packet 800 can then be transmitted toward a decoder for presentation to a user. In the event that the image data packet 800 is received by a transit node that is experiencing congestion, the transit node may apply a packet wash to image data packet 800. The packet wash begins by removing layers, or chunks thereof, from the back of the image data packet 800. Hence, the fifth quality layer of the remaining region 849 is removed first, followed by the fourth quality layer of the remaining region 849, etc. This results in degrading the image quality of the remaining region 849 while maintaining the region of interest 847 at full quality. The image data packet 800 can be transmitted once the size is reduced to a point that the transit node is capable of processing, storing, and/or transmitting the image data packet 800 downstream. Accordingly, in most cases the region of interest 847 is received at full quality with some degradation in the remaining region 849. In the present example, the remaining region 849 is completely removed prior to any loss in quality in the region of interest 847. However, once the first quality layer of the remaining region 849 is removed, the packet wash may proceed to the fifth quality layer of the region of interest 847. When this occurs, the remaining region 849 is completely lost and the region of interest 847 is degraded. This process may continue until the image data packet 800 is small enough to be handled or until the quality of the image data packet 800 is degraded to an unacceptable level. In such a case, the image data packet 800 can be dropped at the transit node.

The image data packet 800 may also contain metadata 850. Metadata 850 is data in a packet that provides information about other data. The metadata 850 may be positioned in a packet header in the image data packet 800, which may be positioned before the coefficients. The metadata 850 may contain various information about the image data, and hence may be used by the decoder to reconstruct the image, for example when image data is lost to a packet wash. For example, the metadata 850 may indicate a position of the region of interest 847 relative to the image, such as an offset between a top left corner of the region of interest 847 and a top left corner of the image. As an example, in the event that all of the image data for the remaining region 849 is lost during a packet wash, the decoder can still use the position of the region of interest 847 to place the region of interest 847 in the correct location in the image. The metadata 850 may also include a number of blocks in the region of interest 847 and a number of blocks in the remaining region 849. Such may also be employed to position quantization coefficients for various chunks into corresponding blocks for the image. The metadata 850 may also include a number of layers for the region of interest 847, the remaining region 849, or both. This indicates the number of quality layers 841 used to encode the image data packet 800. A size of each layer in each block may also be included in the metadata 850. This information can be used to determine which quantization coefficients are associated with which block when data is lost to a packet wash. For example, the number of layers and size of each layer in each block can be used to determine where each quality layer 841 begins and ends so that such data can be correctly assigned to a corresponding block at the decoder. The number of blocks in the region of interest 847 and the remaining region 849 can then be used, in conjunction with the position of the region of interest 847, to place all of the blocks correctly. The metadata 850 may also contain a number of remaining layers for the region of interest 847 and a number of remaining layers for the remaining region 849. These metadata can be decremented any time a quality layer 841 is lost to a packet wash. Hence, the number of remaining layers may be used by the decoder to determine which data is missing for decoding purposes and/or for requesting that the lost data be retransmitted. The metadata 850 may also include a loss tolerance bound for the region of interest 847 and/or the remaining region 849. A transit node may use the loss tolerance to determine if a packet wash would reduce the quality of the image data packet 800 to an unacceptable level. Hence, a transit node may employ the loss tolerance bound(s) to determine when to desist performance of a packet wash and instead drop the entire packet. In some examples, the metadata 850 may also indicated a type of packet encoding, such as the encoding mechanism used in image data packet 800 or the encoding mechanism used in image data packet 900.

By removing quantization coefficients by quality layer 841 in the manner described above, the quantization coefficients are removed in an order that has the least effect on image quality based on image region. In effect, the packet wash performs a quantization on the image data packet 800 during transmission and resizes the underlying image in response to network conditions. Further, the packet wash focuses quantization on the remaining region 849 first, and hence reduces quality that is likely to be less important to a user. Such a real time quantization by a network node may not be otherwise possible without the mechanisms described herein as other networks can only perform quantization during the encoding process and prior to transmission.

Figure 9:
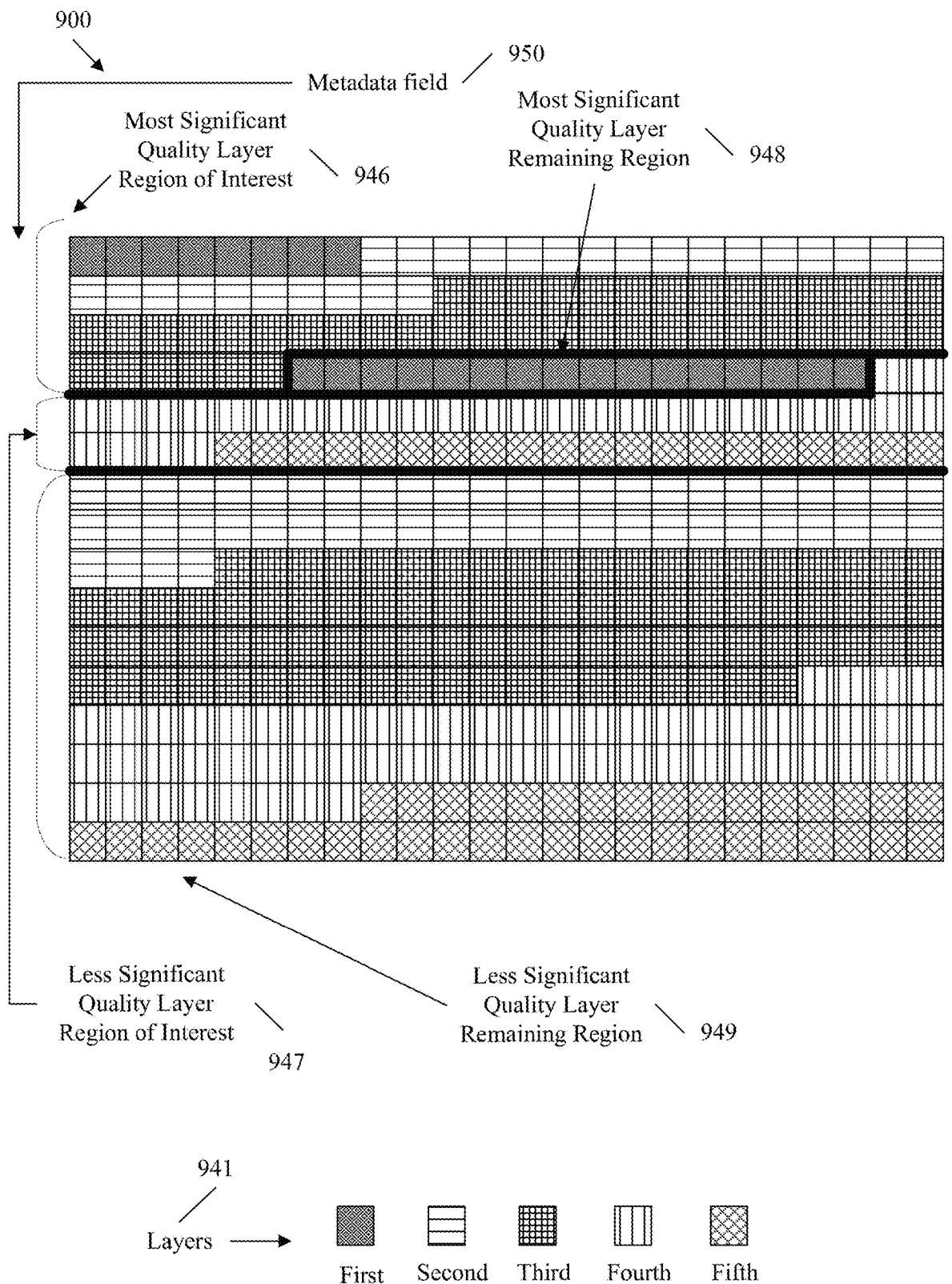
FIG. 9 is a diagram illustrating another example image data packet encoding containing quantization coefficients positioned according to a second example sorting mechanism based on both region of interest and effect on quality instead of based on location in the image data.

FIG. 9 is a diagram illustrating another example image data packet 900 encoding containing quantization coefficients positioned according to a second example sorting mechanism based on effect on quality in both the region of interest and outside the region of interest, instead of only based on effect on quality in the region of interest. Image data packet 900 is an alternative encoding to image data packet 800. Hence, image data packet 900 is an encoding based on image data 700. As such, image data packet 900 may represent image 600. In addition, mechanism 500 can be applied to image data 900 prior to encoding image data packet 900. Further, image data packet 900 can be encoded by an encoder 101 and/or by a content server 103 in network 100, and hence is an example of an image data packet 111. Image data packet 900 contains quantization coefficients positioned to allow a packet wash 200 to be applied to the image data packet 900. For example, image data packet 900 can be encoded by an encoder 301 for transmission 320 as an example of an image data packet 311. Accordingly, image data packet 900 may be coded according to entropy coding as described with respect to quantization coefficients 400.

Image data packet 900 includes quantization coefficients that are sorted into quality layers 941 and includes metadata 950 that are substantially similar to quality layers 841 and metadata 850, respectively. Further, blocks related to the region of interest are positioned prior to blocks related to the remaining region as in image data packet 800. However, image data packet 900 is encoded to cause less important region of interest image data to be discarded before the remaining region image data is completely eliminated.

The image data packet 900 is coded based on a loss tolerance for both the region of interest and a loss tolerance for the remaining region. The image data packet 900 includes quantization coefficients in a most significant quality layer of a region of interest 946, which include the quality layers 941 that contain image data necessary to meet the loss tolerance for the region of interest. The quantization coefficients in the most significant quality layer of the region of interest 946 are positioned first in the image data packet 900. In the present example, the first layer, the second layer, and the third layer of the blocks 5-6 of image data 700 are needed to meet the loss tolerance for the region of interest, and hence are grouped as the quantization coefficients in the most significant quality layer of the region of interest 946.

Next, the image data packet 900 includes quantization coefficients in a most significant quality layer of a remaining region 948, which includes the quality layers 941 that contain image data necessary to meet the loss tolerance for the remaining region. The quantization coefficients in a most significant quality layer of a remaining region 948 are positioned second in the image data packet 900 after the quantization coefficients in the most significant quality layer of the region of interest 946. In the present example, the first layer of the blocks 1-4 of image data 700 are needed to meet the loss tolerance for the remaining region, and hence are assigned as the quantization coefficients in a most significant quality layer of a remaining region 948. Accordingly, the number of layers in the most significant quality layers of the remaining region 948 (e.g., one) may be different than the number of layers in the most significant quality layer of the region of interest 946 (e.g., three) even though the region of interest and the remaining region may include the same number of layers.

The quantization coefficients in the most significant quality layer of the region of interest 946 and the quantization coefficients in the most significant quality layer of the remaining region 948 contain enough image data to meet the tolerance for the region of interest and the remaining region, respectively. The remaining higher quality quantization coefficients 948 can then be positioned after the quantization coefficients in the most significant quality layer of the region of interest 946 and the quantization coefficients in the most significant quality layer of the remaining region 948. The image data packet 900 includes quantization coefficients in a less significant quality layer of a region of interest 947, which are coefficients from the region of interest that are not required to meet the region of interest loss tolerance. In the present example, layer four and layer five of the blocks 5-6 of image data 700 are included in the quantization coefficients in the less significant quality layer of the region of interest 947. The quantization coefficients in the less significant quality layer of the region of interest 947 are positioned after the quantization coefficients in the most significant quality layer of the remaining region 948. Finally, the image data packet 900 also includes quantization coefficients in a less significant quality layer of the remaining region 949, which are coefficients from the remaining region that are not required to meet the remaining region loss tolerance. In the present example, layers two through five of the blocks 1-4 of image data 700 are included in the quantization coefficients in the less significant quality layer of the remaining region 949. The quantization coefficients in the less significant quality layer of the remaining region 949 are positioned after the quantization coefficients in the less significant quality layer of the region of interest 947.

The benefit of image data packet 900 is that some of the remaining region image data is retained even when the packet wash begins to reduce the quality of the region of interest. When congestion is encountered, a transit node may apply a packet wash to the image data packet 900. The quantization coefficients in the less significant quality layer of the remaining region 949 are positioned last, and hence layers from the remaining region, or chunks thereof, are removed first. In this way, the quality of the remaining region is reduced first, but such reduction is bounded to ensure that at least some of the remaining region image data is retained. If the image data packet 900 is still too large to be handled in spite of the congestion, the packet wash can begin removing layers, or chunks thereof, from the region of interest by removing from the quantization coefficients in the less significant quality layer of the region of interest 947. In some implementations, the image data packet 900 may be dropped if handling would require further application of a packet wash to remove image data from the quantization coefficients in the most significant quality layer of the remaining region 948. However, some examples may allow the quantization coefficients in the most significant quality layer of the remaining region 948 to be removed after the quantization coefficients in the less significant quality layer of the region of interest 947. The quantization coefficients in the most significant quality layer of the region of interest 946 can then be removed last, as needed. This results in removing quality from the remaining region, then removing quality from the region of interest, if needed, while retaining a minimum level of quality for both the region of interest and the remaining region if possible.

Figure 10:
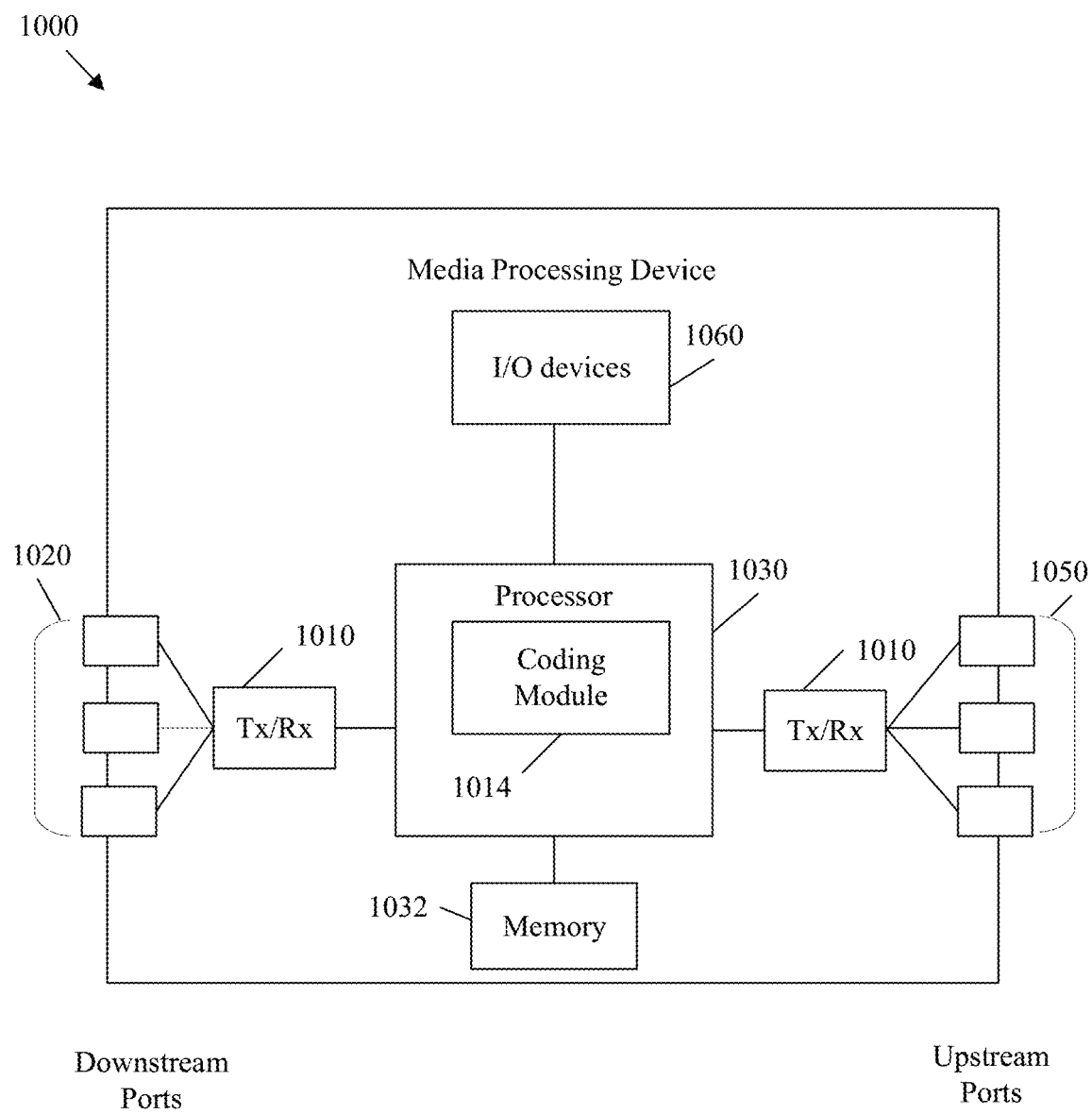
FIG. 10 is a diagram of an example image processing device.

FIG. 10 is a diagram of an example media processing device 1000. The media processing device 1000 is suitable for implementing the disclosed examples/embodiments as described herein. The media processing device 1000 comprises downstream ports 1020, upstream ports 1050, and/or transceiver units (Tx/Rx) 1010, including transmitters and/or receivers for communicating data upstream and/or downstream over a network. The media processing device 1000 also includes a processor 1030 including a logic unit and/or central processing unit (CPU) to process the data and a memory 1032 for storing the data. The media processing device 1000 may also comprise electrical, optical-to-electrical (OE) components, electrical-to-optical (EO) components, and/or wireless communication components coupled to the upstream ports 1050 and/or downstream ports 1020 for communication of data via electrical, optical, or wireless communication networks. The media processing device 1000 may also include input and/or output (I/O) devices 1060 for communicating data to and from a user. The I/O devices 1060 may include output devices such as a display for displaying image and/or video data. The I/O devices 1060 may also include input devices, such as a keyboard, mouse, trackball, etc., and/or corresponding interfaces for interacting with such output devices.

The processor 1030 is implemented by hardware and software. The processor 1030 may be implemented as one or more CPU chips, cores (e.g., as a multi-core processor), field-programmable gate arrays (FPGAs), application specific integrated circuits (ASICs), and digital signal processors (DSPs). The processor 1030 is in communication with the downstream ports 1020, Tx/Rx 1010, upstream ports 1050, and memory 1032. The processor 1030 comprises a coding module 1014. The coding module 1014 implements the disclosed embodiments described herein, such as packet wash 200, mechanism 500, and/or method 1100, 1200, 1300, and/or 1400, which may employ quantization coefficients 400, an image 600, an image data 700, an image data packet 800, and/or an image data packet 900. The coding module 1014 may also implement any other method/mechanism described herein. Further, the coding module 1014 may implement a device in network 100, a device in system 300 and/or a device in system 1500. For example, when operating on an encoder the coding module 1014 may transform image data, such as an image, into quantization coefficients. The coding module 1014 can then assign the quantization coefficients into layers based on their effect on image data/image quality and position such quantization coefficients for transmission in a packet based on layer and based on whether corresponding blocks are included in a region of interest. When operating on a network node, the coding module 1014 may perform a packet wash by iteratively discarding portions of an image data packet based on a combination of level and correlation with a region of interest. This allows the image data packet to be transmitted at a lower quality rather than being dropped while prioritizing higher quality for the region of interest portion of the image. When operating on a decoder node, the coding module 1014 may sort quantization coefficients from a layer ordering to an ordering based on block position and position the quantization coefficients based on correlation with a region of interest. This allows the decoder to decode the image data from an image data packet that has processed according to qualitative communication mechanisms while prioritizing for quality in the region of interest. Accordingly, the coding module 1014 may be configured to perform mechanisms to address one or more of the problems discussed above. Hence, coding module 1014 causes the image processing device 1000 to provide additional functionality and/or coding efficiency when coding image data. As such, the coding module 1014 improves the functionality of the media processing device 1000 as well as addresses problems that are specific to the image coding arts. Further, the coding module 1014 affects a transformation of the media processing device 1000 to a different state. Alternatively, the coding module 1014 can be implemented as instructions stored in the memory 1032 and executed by the processor 1030 (e.g., as a computer program product stored on a non-transitory medium).

The memory 1032 comprises one or more memory types such as disks, tape drives, solid-state drives, read only memory (ROM), random access memory (RAM), flash memory, ternary content-addressable memory (TCAM), static random-access memory (SRAM), etc. The memory 1032 may be used as an over-flow data storage device, to store programs when such programs are selected for execution, and to store instructions and data that are read during program execution.

Figure 11A:
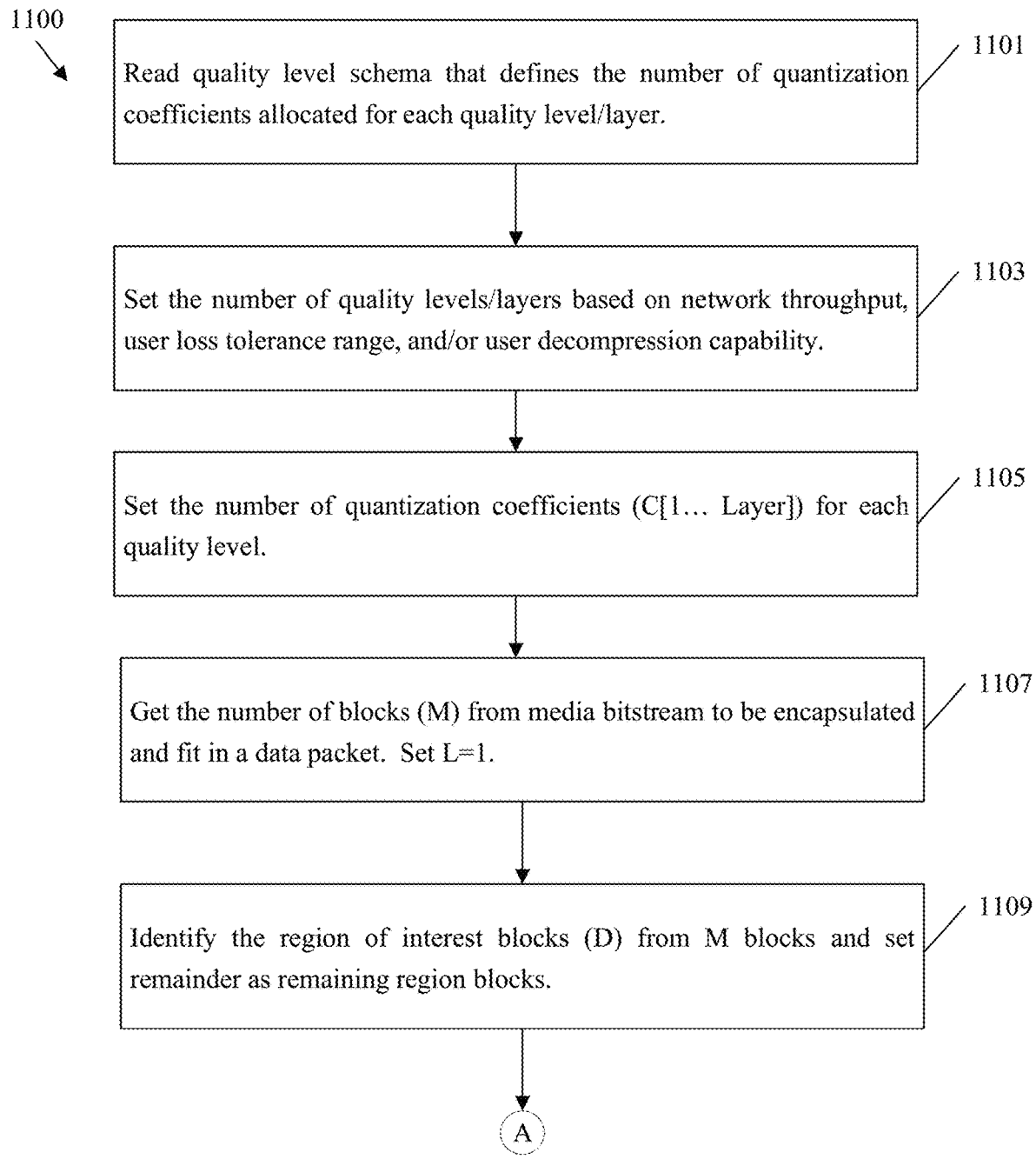
FIGS. 11A and 11B depict a flowchart of an example method of encoding image data based on a region of interest to support qualitative communication.
Figure 11B:
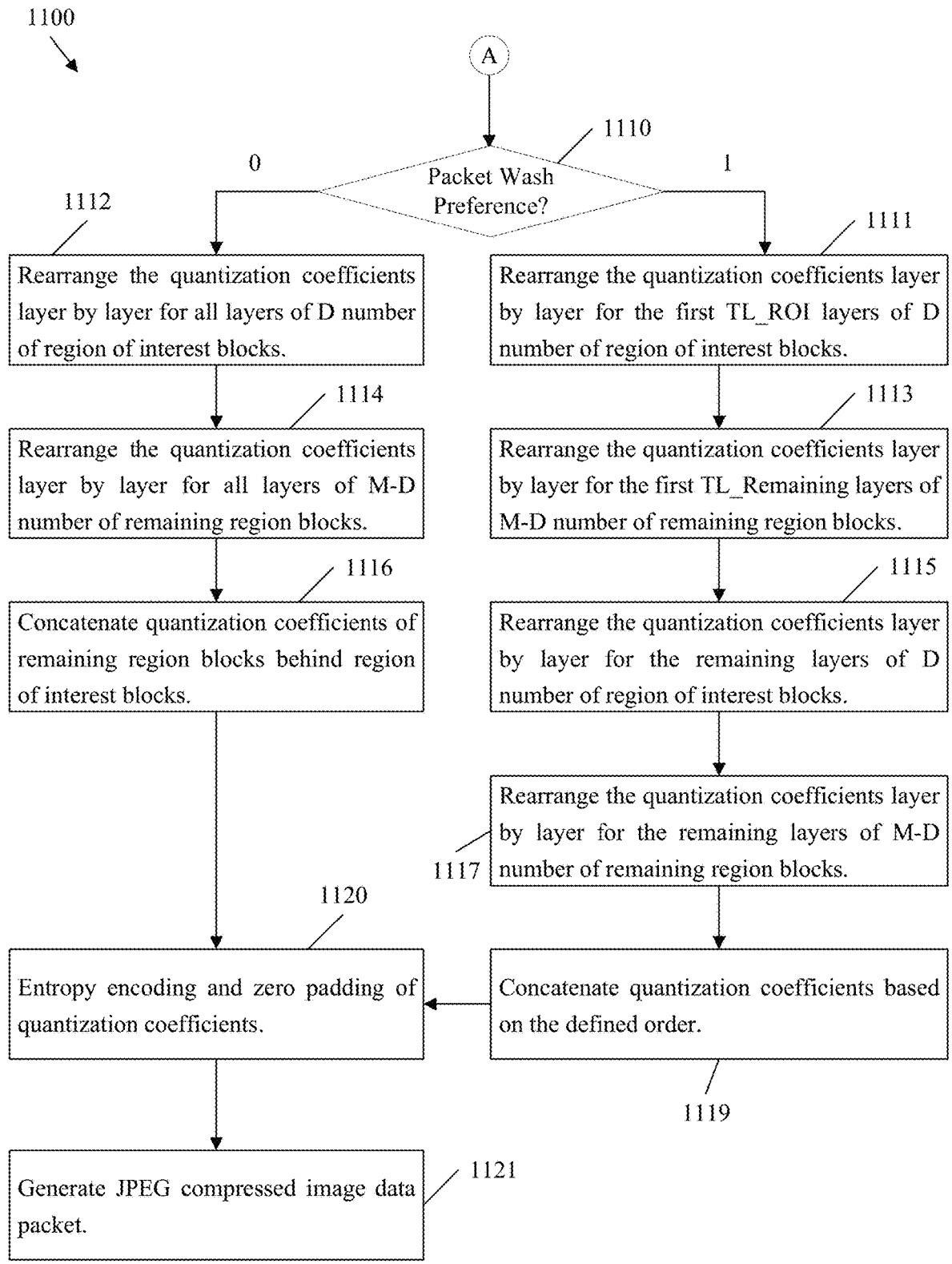

FIGS. 11A and 11B depict a flowchart of an example method 1100 of encoding image data, such as image data 700, based on a region of interest to support qualitative communication. For example, method 1100 can be employed to encode image data from an image 600 as quantization coefficients 400 in an image data packet 800 and/or 900 for use in conjunction with mechanism 500 and/or a packet wash 200. As an example, method 1100 may be implemented by an encoder in network 100, an encoder in system 300, and/or a media processing device 1000.

Referring to FIG. 11A, method 1100 may be initialized when an encoder determines to encode image data, such as a JPEG. At step 1101, the encoder obtains and reads a quality level schema. The quality level schema defines the number of quantization coefficients allocated for each quality layer. It should be noted that a quality layer may also be referred to as a quality level. The quality level schema may be predefined. Further, a region of interest may be predetermined by a content creator and/or an artificial intelligence (AI) algorithm. In another example, a user may indicate a lower quality bound for requested content, and the quality level schema may be computed based on the lower quality bound. For example, a user may indicate an interested object and/or region of interest, indicate a lower quality bound for the region of interest containing the lower quality bound, and/or indicate a lower quality bound for the remainder of the image.

At step 1103, the encoder can set the number of quality levels/layers based on the schema and any associated data known to the encoder. For example, the encoder can set the number of quality levels/layers based on current/average network throughput, a user loss tolerance level, and/or user decompression capabilities.

At step 1105, the encoder can set the number of quantization coefficients for each quality level/layer. For example, the maximum number of quantization coefficients for a layer may be denoted as Layer and the set of quantization coefficients for a layer may be denoted as C[1 . . . Layer].

At step 1107, the encoder can get/obtain the number of blocks, denoted as M, to be encapsulated and fit into an image data packet from an image bitstream. The encoder can also set a counter variable indicating a current layer (L) equal to one.

At step 1109, the encoder can identify the number of blocks that are included in the interested object, denoted as D, and hence determine the number of blocks in the region of interest. The encoder can set the remainder (M minus D) as remaining region blocks.

The method 1100 may proceed to step 1110 in FIG. 11B. At step 1110, the encoder determines a packet wash preference. The packet wash preference of step 1110 may indicate whether to encode according to the mechanism of image data packet 800 or the mechanism of image data packet 900. For example, when the packet wash preference is set to zero, the encoder can proceed to step 1112 to encode the image according to the mechanism of image data packet 800. Further, when the packet wash preference is set to one, the encoder can proceed to step 1111 to encode the image according to the mechanism of image data packet 900.

Accordingly, the encoder proceeds to step 1112 when all blocks of the region of interest are to be encoded before all blocks of the remaining region. At step 1112, the encoder rearranges the quantization coefficients layer by layer for the region of interest blocks. For example, the encoder can rearrange the quantization coefficient for all layers for blocks D containing the interested object in the region of interest as determined in step 1109. At step 1114, the encoder rearranges the quantization coefficients layer by layer for the blocks in the remaining region outside the region of interest. For example, the encoder can rearrange the quantization coefficient for all layers for blocks M-D that do not contain the interested object and are not included in the region of interest as determined in step 1109. At step 1116, the encoder concatenates the quantization coefficients of the remaining region blocks behind the region of interest blocks. The encoder can then proceed to step 1120.

When the packet wash preference of step 1110 indicates that at least some of the quantization coefficients of the remaining region should be prioritized, the encoder can proceed to step 1111. At step 1111, the encoder rearranges the quantization coefficients layer by layer for the first layers of the region of interest blocks based on the loss tolerance level for the region of interest (TL_ROI). For example, when the loss tolerance level allows for the loss of all but three layers in blocks D containing the interested object, then the encoder rearranges the first three layers of the blocks in the region of interest as determined in step 1109. At step 1113, the encoder rearranges the quantization coefficients layer by layer for the first layers of the remaining region blocks M-D outside of the region of interest based on the tolerance level for the remaining region (TL_Remaining). For example, when the loss tolerance level allows for the loss of all but one layer in blocks M-D that do not contain the interested object, then the encoder rearranges the first layer of the blocks outside of the region of interest as determined in step 1109. At step 1115, the encoder rearranges the quantization coefficients layer by layer for the remaining higher quality layers of the region of interest blocks based on the tolerance level. For example, when the loss tolerance level allows for the loss of all but three layers in blocks D containing the interested object, then the encoder rearranges all layers after three for the blocks in the region of interest as determined in step 1109. At step 1117, the encoder rearranges the quantization coefficients layer by layer for the remaining higher quality layers of the remaining region blocks based on the tolerance level. For example, when the loss tolerance level allows for the loss of all but one layer in blocks M-D that do not contain the interested object, then the encoder rearranges all layers after layer one for the blocks outside the region of interest as determined in step 1109. At step 1119, the encoder concatenates the quantization coefficients based on the order described in steps 1111, 1113, 1115, and 1117. The encoder can then proceed to step 1120.

At step 1120, the encoder employs entropy coding, such as Huffman encoding, for example as described with respect to encoding 317 and quantization coefficients 400. This process may involve generating codewords to represent the quantization coefficients and then employing zero padding of the quantization coefficients. At step 1121, the encoder can then generate a compressed image data packet, such as image data packet 800 and/or 900.

Figure 12:
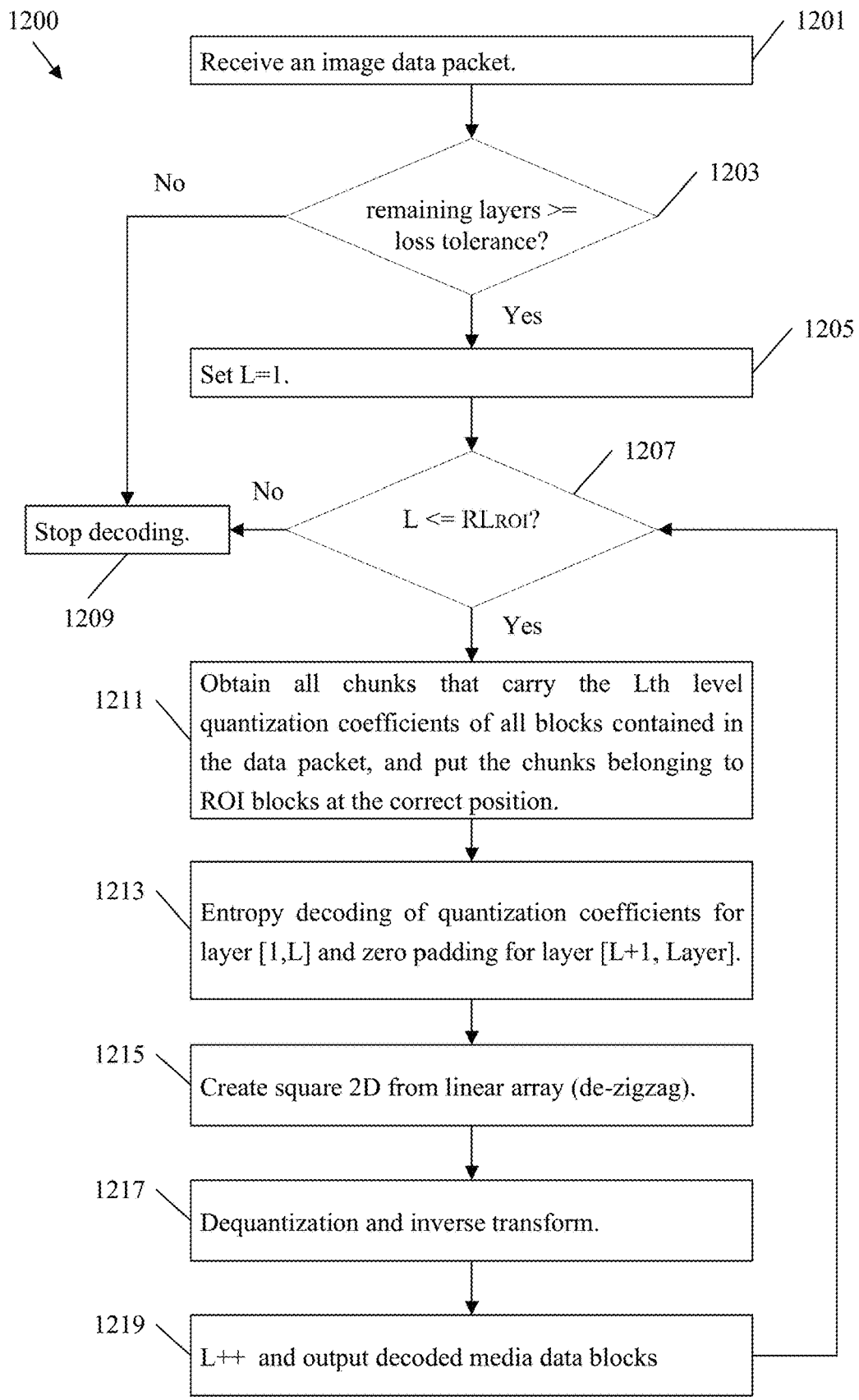
FIG. 12 is a flowchart of an example method of decoding image data sorted based on a region of interest and processed by qualitative communication.

FIG. 12 is a flowchart of an example method 1200 of decoding image data, such as image data 700, sorted based on a region of interest and processed by qualitative communication. For example, method 1200 can be employed to decode quantization coefficients 400 in an image data packet 800 and/or 900 to reconstruct a copy of an image 600. This may occur when such data packets have received a packet wash 200. Method 1200 may also reverse a mechanism 500 to reconstruct an image from image data. As an example, method 1200 may be implemented by a decoder in network 100, a decoder in system 300, and/or a media processing device 1000. Further, method 1200 can be applied at a decoder in response to method 1100.

At step 1201, the decoder receives an image data packet, such as an image data packet 800 and/or 900. The image data packet contains encoded quantization coefficients arranged based on quality layer instead of based on an order of blocks in the image data. Further, the quantization coefficients are arranged so that quantization coefficients related to a region of interest are prioritized over quantization coefficients related to remaining regions of the image. The decoder can obtain various data from a metadata field in the image data packet. Such data may include a loss tolerance of the region of interest, a loss tolerance of the remaining region, a number of layers, a number of remaining layers, a position of the region of interest, a number of blocks in the region of interest, a number of blocks in the remaining region, a type of packetization, a size of each layer in each block, etc. The decoder can compare the remaining quality layers for the region of interest and the remaining region to the loss tolerance for the region of interest and the remaining region, respectively, at step 1203. If the remaining quality layers of either region are not greater than or equal to the corresponding loss tolerance, then the decoder proceeds to step 1209 and stops further decoding. This occurs when the image data has been degraded/quantized too much during a packet wash to meet the user's requested minimum quality. If the remaining quality layers for both regions are greater than or equal to the corresponding loss tolerance lower bounds, then the decoder proceeds to step 1205 and sets a counter variable for a current layer L equal to one.

At step 1207, the decoder can check to determine whether current layer L is less than or equal to the number of remaining layers in the region of interest. If L is greater than (not less than or equal to) the number of remaining layers of the region of interest, then the decoder proceeds to step 1209 and stops decoding because the process is complete. If L is less than or equal to the number of remaining layers of the region of interest at step 1207, then the decoder determines to decode the current layer L and proceeds to step 1211. It should be noted that the number of layers in the remaining region is always less than or equal to the number of layers in the region of interest. As such, decoding is complete when all layers in the region of interest have been decoded.

At step 1211, the decoder obtains all chunks from the image data packet that carry Lth level quantization coefficients for any/all blocks contained in the image data packet. The decoder then places the chunks that are included in blocks in the region of interest in the correct location in the image, for example based on the metadata indicating the position of the region of interest and the number of blocks in the region of interest. The decoder also places any/all chunks that are included in blocks in the remaining region in the image based on the number of blocks in the image, the number of blocks in the region of interest, the number of blocks in the remaining region, the position of the blocks in the region of interest, etc. At step 1213, the decoder performs entropy decoding, such as Huffman decoding, for the quantization coefficients obtained at step 1211. For example, the decoder can iteratively decode layers [1,L] and apply zero padding for layers [L+1, Layer].

At step 1215, the decoder can create a two dimensional (2D) square matrix for each block from the linear array of quantization coefficients obtained from the image data packet. This process may also be referred to as a de-zigzag and has the effect of positioning the quantization coefficients back in their proper position in a block matrix for decoding.

At step 1217, the decoder applies any dequantization algorithms along with an inverse transform (e.g., inverse DCT) to reconstruct the blocks of image data at the current quality layer L. As step 1217 is part of an iterative loop, the blocks are decoded at a lowest quality and then incrementally improved as further quality layers are added. The decoder can then proceed to step 1219, increment L to proceed to the next quality layer, output the decoded image data blocks and return to step 1207 to decode the next quality layer.

Figure 13:
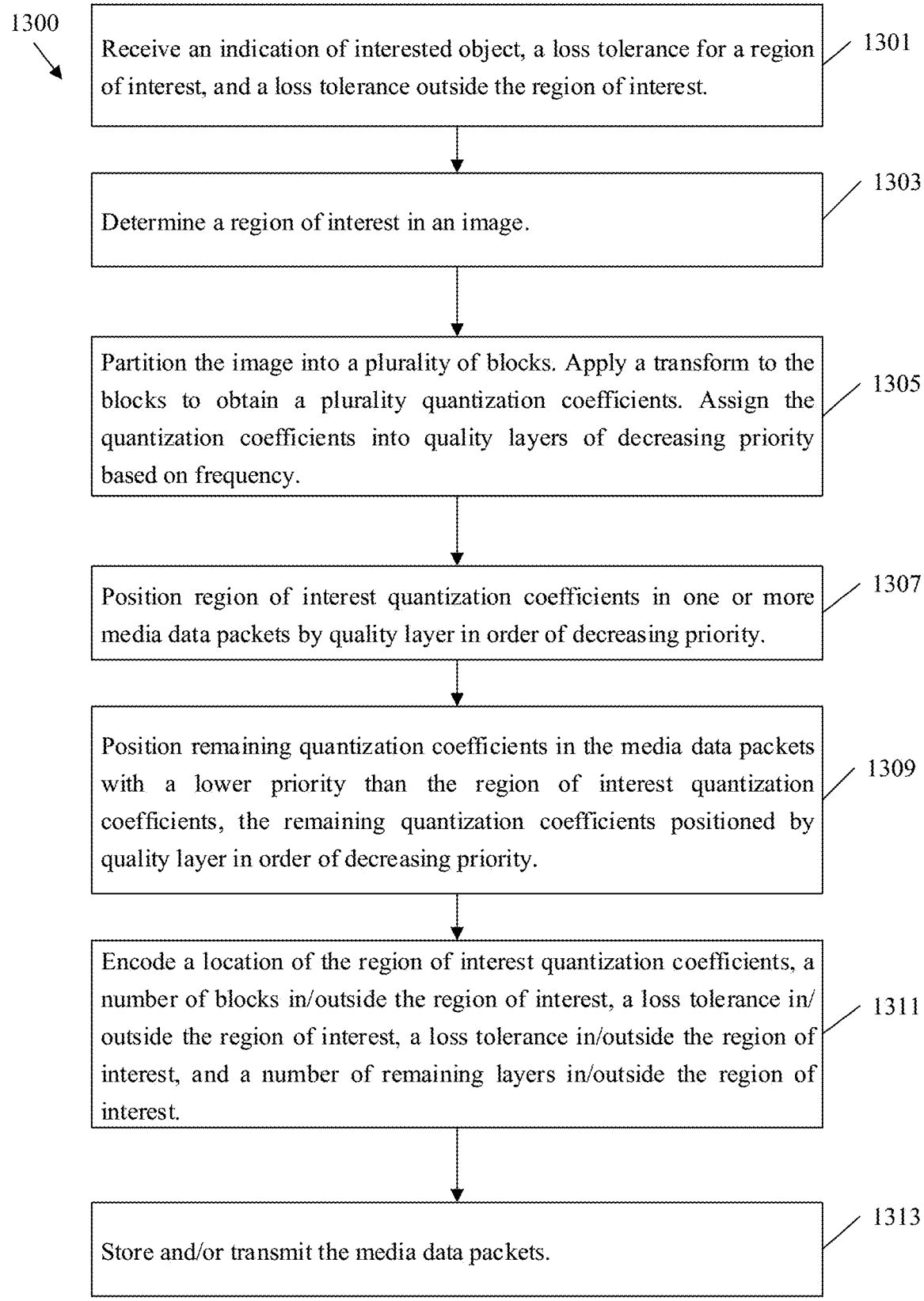
FIG. 13 is a flowchart of another example method of encoding image data based on a region of interest to support qualitative communication.

FIG. 13 is a flowchart of another example method 1300 of encoding image data, such as image data 700, based on a region of interest to support qualitative communication. In an example, method 1300 may be used as an implementation of method 1100 in preparation for decoding by method 1200. For example, method 1300 can be employed to encode image data from an image 600 as quantization coefficients 400 in an image data packet 800 and/or 900 for use in conjunction with mechanism 500 and/or a packet wash 200. As an example, method 1300 may be implemented by an encoder in network 100, an encoder in system 300, and/or a media processing device 1000.

Method 1300 may be initialized when an encoder determines to encode image data of an image, such as a JPEG. At step 1301, the encoder receives an indication of an interested object. Such an indication indicates the presence and/or location of an interested object in the image. Such an indication may be received from a decoder and/or received from a content creator. The encoder can receive other data at step 1301, such as a loss tolerance for a region of interest and/or a loss tolerance for a remaining region that is outside the region of interest. Such data may also be received from a decoder and/or received from a content creator.

At step 1303, the encoder can determine a region of interest in an image. The determination can be made based on the indication of interested object. For example, the indication of interest object may indicate the boundaries of the interested object. The encoder can then use the boundaries of the interested object to determine the portion of the image that is located in the region of interest. As an example, a content creator may indicate such boundaries. In another example, the user may indicate the interested object and an AI construct or other pattern matching software may determine the boundaries associated with the interested object.

At step 1305, the encoder can partition the image into a plurality of blocks. Blocks inside the boundaries of the interested object are part of the region of interest, while blocks that are outside of the boundaries of the interested object are part of the remaining region. The encoder can then apply a transform, such as a DCT, to the blocks to obtain a plurality of quantization coefficients. The encoder can then assign the quantization coefficients into quality layers of decreasing priority based on frequency. For example, each subsequent layer includes data to incrementally increase quality of a reconstructed image.

At step 1307, the encoder can position region of interest quantization coefficients in one or more image data packets by quality layer in order of decreasing priority. At step 1309, the encoder can position remaining quantization coefficients in the image data packets with a lower priority than the region of interest quantization coefficients. The remaining quantization coefficients are also positioned by quality layer in order of decreasing priority. In some examples, all of the region of interest quantization coefficients are positioned in the image data packets with a higher priority than the remaining quantization coefficients as shown in image data packet 800.

In another example, the region of interest quantization coefficients are organized into quality layers and positioned in the image data packets based on the loss tolerance for the region of interest. Further, the remaining quantization coefficients may be organized into quality layers and positioned in the image data packets based on the loss tolerance outside the region of interest. For example, the region of interest quantization coefficients may comprise quantization coefficients in a most significant quality layer of a region of interest and quantization coefficients in a less significant quality layer of the region of interest. The remaining quantization coefficients may also comprise quantization coefficients in the most significant quality layer of the remaining region and quantization coefficients in the less significant quality layer of the remaining region. In such a case, the quantization coefficients in the most significant quality layer of the region of interest are positioned in the image data packets with a higher priority than the quantization coefficients in the most significant quality layer of the remaining region. Further, the quantization coefficients in the most significant quality layer of the remaining region are positioned in the image data packets with a higher priority than the quantization coefficients in the less significant quality layer of the region of interest. In addition, the quantization coefficients in the less significant quality layer of the region of interest are positioned in the image data packets with a higher priority than the quantization coefficients in the less significant quality layer of the remaining region. This results in an encoding as shown in image data packet 900.

At step 1311, the encoder can encode metadata into the image data packets. For example, the encoder can encode a location of the region of interest quantization coefficients in the reconstructed image as metadata in the image data packets. As another example, the encoder can encode an indication of a number of blocks in the region of interest as metadata in the image data packets. As another example, the encoder can encode an indication of a number of blocks outside the region of interest as metadata in the image data packets. As another example, the encoder can encode an indication of a loss tolerance for the region of interest as metadata in the image data packets. As another example, the encoder can encode an indication of a loss tolerance outside the region of interest as metadata in the image data packets. As another example, the encoder can encode an indication of a number of remaining layers for the region of interest as metadata in the image data packets. As another example, the encoder can encode an indication of a number of remaining layers outside the region of interest as metadata in the image data packets.

At step 1313, the encoder can store the image data packets for transmission. Further, the encoder can transmit the image data packets over a network toward a decoder. Such transmission may occur via a content server in some cases.

FIG. 14 is a flowchart of another example method 1400 of decoding image data, such as image data 700, sorted based on a region of interest and processed by qualitative communication. In an example, method 1400 may be used as an implementation of method 1200 in response to method 1100 and/or 1300. For example, method 1400 can be employed to decode quantization coefficients 400 in an image data packet 800 and/or 900 to reconstruct a copy of an image 600. This may occur when such data packets have received a packet wash 200. Method 1400 may also reverse a mechanism 500 to reconstruct an image from image data. As an example, method 1400 may be implemented by a decoder in network 100, a decoder in system 300, and/or a media processing device 1000.

Method 1400 may begin when a decoder requests and/or receives an image data packet. The image data packet may have been processed by a packet wash process. For example, a transit node may drop quality layers of the image data packet during transit to the decoder as part of a packet wash to overcome network congestion. Such a process may comprise dropping data from a group of remaining quantization coefficients prior to dropping data from region of interest quantization coefficients in response to detected congestion in a qualitative communication network. As such, the received image data packet may include different numbers of quality levels of quantization coefficients in a region of interest and in a remaining region outside of the region of interest. When the decoder optionally requests the image, the decoder may transmit a request for the image to an encoder and/or content server. The request for the image may contain various parameters, such as an indication of an interested object represented by the region of interest, a loss tolerance for the region of interest, a loss tolerance outside the region of interest, or combinations thereof. The encoder may encode the image data packets based on such parameters.

At step 1401, the decoder receives one or more image data packets for an image. The image contains a plurality of blocks. The image also includes a region of interest and a remaining region outside the region of interest. The blocks are coded as quantization coefficients corresponding to a transform, such as a DCT. The quantization coefficients are positioned in the image data packets in quality layers of decreasing priority based on frequency. For example, each subsequent quality layer may include data to incrementally increase the quality of a reconstructed image. Further, the region of interest quantization coefficients are positioned in the image data packets with a higher priority than the remaining quantization coefficients. In some examples, all of the region of interest quantization coefficients are positioned in the image data packets with a higher priority than the remaining quantization coefficients as shown in image data packet 800.

In another example, the region of interest quantization coefficients are organized into quality layers and positioned in the image data packets based on the loss tolerance for the region of interest. Further, the remaining quantization coefficients may be organized into quality layers and positioned in the image data packets based on the loss tolerance outside the region of interest. For example, the region of interest quantization coefficients may comprise quantization coefficients in a most significant quality layer of a region of interest and quantization coefficients in a less significant quality layer of a region of interest. The remaining quantization coefficients may also comprise quantization coefficients in the most significant quality layer of the remaining region and quantization coefficients in a less significant quality layer of the remaining region. In such a case, the quantization coefficients in the most significant quality layer of the region of interest are positioned in the image data packets with a higher priority than the quantization coefficients in the most significant quality layer of the remaining region. Further, the quantization coefficients in the most significant quality layer of the remaining region are positioned in the image data packets with a higher priority than the quantization coefficients in the less significant quality layer of the region of interest. In addition, the quantization coefficients in the less significant quality layer of the region of interest are positioned in the image data packets with a higher priority than the quantization coefficients in the less significant quality layer of the remaining region. This results in an encoding as shown in image data packet 900.

At step 1403, the decoder positions the region of interest quantization coefficients in the image based on a location of the region of interest quantization coefficients contained as metadata in the image data packets. In some examples, the image data packets contain an indication of a number of blocks in the region of interest. The region of interest quantization coefficients can also be positioned in the image based on the number of blocks in the region of interest. In some examples, the image data packets contain an indication of a number of blocks outside the region of interest. The region of interest quantization coefficients can also be positioned in the image based on the number of blocks outside the region of interest.

At step 1405, the decoder can iteratively decode each block from the quantization coefficients in order of most significant quality layer to least significant quality layer via an inverse transform, such as an inverse DCT. In some examples, the image data packets contain an indication of a number of remaining layers for the region of interest. The image data packets may contain an indication of a loss tolerance for the region of interest. In such a case, the blocks can be decoded when the number of remaining layers for the region of interest meets or exceeds the loss tolerance for the region of interest. In some examples, the image data packets contain an indication of a number of remaining layers outside the region of interest. The image data packets may contain an indication of a loss tolerance outside the region of interest. In such a case, the blocks can be decoded when the number of remaining layers outside the region of interest meets or exceeds the loss tolerance outside the region of interest.

At step 1407, the decoder can combine the blocks to reconstruct the image at the least significant quality layer (e.g., the highest quality layer) remaining for each of the region of interest and the remaining region. It should be noted that the image data packets may contain a number of layers in the metadata. In some cases, the blocks of the image for the region of interest are reconstructed at a quality that is less than a quality of an encoded version of the image when the number of remaining layers for the region of interest is less than the number of layers. Further, blocks of the image outside the region of interest are reconstructed at a quality that is less than a quality of an encoded version of the image when the number of remaining layers outside the region of interest is less than the number of layers. In some cases, the quality for blocks of the image for the region of interest may be greater than the quality for blocks of the image outside the region of interest.

In an example implementation, the decoder may request that quality layers lost during a packet wash be retransmitted. In such a case, the decoder can determine missing layers for the region of interest by comparing the number of remaining layers for the region of interest to the number of layers. The decoder can then transmit a request to resend the missing layers for the region of interest. Further, the decoder can determine missing layers outside the region of interest by comparing the number of remaining layers outside the region of interest to the number of layers. The decoder can then transmit a request to resend the missing layers outside the region of interest.

FIG. 15 is a diagram of an example system 1500 for applying qualitative communication to an image data packet, such as image data packet 800, and/or 900, based on a region of interest, such as region of interest 647 in image 600. Accordingly, system 1500 may be employed to perform a packet wash 200, mechanism 500, and/or method 1100, 1200, 1300, and/or 1400 as applied to quantization coefficients 400 and/or image data 700. System 1500 may be implemented by an encoder and a decoder such as nodes in network 100, devices in system 300, and/or a media processing device 1000.

The system 1500 includes an encoder 1510. The encoder 1510 comprises a determining module 1511 for determining a region of interest in an image. The encoder 1510 further comprises a partitioning module 1512 for partitioning the image into a plurality of blocks. The encoder 1510 further comprises an application module 1513 for applying a transform to the blocks to obtain a plurality of quantization coefficients. The encoder 1510 further comprises an assigning module 1514 for assigning the quantization coefficients into quality layers of decreasing priority based on frequency, wherein each subsequent layer includes data to incrementally increase quality of a reconstructed image. The encoder 1510 further comprises a positioning module 1515 for positioning region of interest quantization coefficients in one or more image data packets by quality layer in order of decreasing priority. The positioning module 1515 is further for positioning remaining quantization coefficients in the image data packets with a lower priority than the region of interest quantization coefficients, the remaining quantization coefficients positioned by quality layer in order of decreasing priority. The encoder 1510 further comprises a storing module 1516 for storing the image data packets. The encoder 1510 further comprises a transmitter 1517 for transmitting the image data packets over a network toward a decoder 1520. The encoder 1510 may be further configured to perform any of the steps of method 1100 and/or 1300.

The system 1500 includes a decoder 1520. The decoder 1520 comprises a receiver 1521 for receiving one or more image data packets for an image containing a plurality of blocks, wherein the image includes a region of interest, wherein the blocks are coded as quantization coefficients corresponding to a transform, wherein the quantization coefficients are positioned in the image data packets in quality layers of decreasing priority based on frequency, wherein each subsequent quality layer includes data to incrementally increase quality of a reconstructed image, and wherein region of interest quantization coefficients are positioned in the image data packets with a higher priority than the remaining quantization coefficients. The decoder 1520 further comprises a decoding module 1522 for decoding each block from the quantization coefficients in order of most significant quality layer to least significant quality layer via an inverse transform. The decoding module 1522 is further for combining the blocks to reconstruct an image. The decoder 1520 further comprises a forwarding module 1523 for forwarding the reconstructed image toward a display. The decoder 1520 may be further configured to perform any of the steps of method 1200 and/or 1400. The encoder 1510 and the decoder 1520 are operatively coupled to each other in a manner sufficient to facilitate the embodiments disclosed herein.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by a network device, the method comprising:
   determining, by at least one processor of an encoder, a region of interest in an image;
   partitioning, by the at least one processor, the image into a plurality of blocks;
   applying, by the at least one processor, a transform to the blocks to obtain a plurality of coefficients;
   assigning, by the at least one processor, the coefficients into quality layers of decreasing priority, each subsequent layer including data to incrementally increase quality of a reconstructed image;
   positioning, by the at least one processor, region of interest coefficients in one or more image data packets by quality layer and in an order of decreasing priority;
   positioning, by the at least one processor, remaining coefficients in the image data packets with a lower priority than the region of interest coefficients, the remaining coefficients positioned by quality layer and in the order of decreasing priority;
   storing, by a memory of the encoder, the image data packets; and
   transmitting, by a transmitter, the image data packets over a network.

2. The method of claim 1, wherein the region of interest coefficients comprise coefficients in a most significant quality layer of a region of interest and coefficients in a less significant quality layer of the region of interest, wherein the remaining coefficients comprise coefficients in a most significant quality layer of a remaining region and coefficients in a less significant quality layer of the remaining region, wherein the coefficients in the most significant quality layer of the region of interest are positioned in the image data packets with a higher priority than the coefficients in the most significant quality layer of the remaining region, wherein the coefficients in the most significant quality layer of the remaining region are positioned in the image data packets with a higher priority than the coefficients in the less significant quality layer of the region of interest, and wherein the coefficients in the less significant quality layer of the region of interest are positioned in the image data packets with a higher priority than the coefficients in the less significant quality layer of the remaining region.

3. The method of claim 1, wherein the region of interest coefficients are positioned in the image data packets with a higher priority than the remaining coefficients.

4. The method of claim 1, further comprising encoding in a header of the image data packets, by the at least one processor, a location of the region of interest coefficients in the reconstructed image.

5. The method of claim 1, further comprising encoding in a header of the image data packets, by the at least one processor, an indication of a number of blocks in the region of interest.

6. The method of claim 1, further comprising encoding in a header of the image data packets, by the at least one processor, an indication of a number of blocks outside the region of interest.

7. The method of claim 6, further comprising receiving, by a receiver, a loss tolerance for the region of interest from a decoder, wherein the region of interest coefficients are assigned into quality layers and positioned in the image data packets based on the loss tolerance for the region of interest.

8. The method of claim 7, further comprising encoding in a header of the image data packets, by the at least one processor, a loss tolerance outside the region of interest.

9. The method of claim 8, further comprising receiving, by the receiver, the loss tolerance outside the region of interest from the decoder, wherein the remaining coefficients are organized into quality layers and positioned in the image data packets based on the loss tolerance outside the region of interest.

* * * * *